(12) United States Patent
Kelly

(10) Patent No.: US 10,694,611 B2
(45) Date of Patent: *Jun. 23, 2020

(54) NETWORK POWER SWITCH

(71) Applicant: Belkin International, Inc., Playa Vista, CA (US)

(72) Inventor: Francis Michael Kelly, Thousand Oaks, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,654

(22) Filed: Dec. 18, 2018

(65) Prior Publication Data

US 2019/0124752 A1 Apr. 25, 2019

Related U.S. Application Data

(63) Continuation of application No. 15/852,958, filed on Dec. 22, 2017, now Pat. No. 10,194,512, which is a continuation-in-part of application No. 15/411,537, filed on Jan. 20, 2017, now Pat. No. 9,892,630, which is a continuation-in-part of application No.
(Continued)

(51) Int. Cl.
H05B 37/02 (2006.01)
H05B 47/19 (2020.01)
G08C 17/02 (2006.01)
H04Q 9/00 (2006.01)
H05B 47/105 (2020.01)

(52) U.S. Cl.
CPC ............. H05B 47/19 (2020.01); G08C 17/02 (2013.01); H04Q 9/00 (2013.01); H05B 47/105 (2020.01); G08C 2201/40 (2013.01); G08C 2201/93 (2013.01)

(58) Field of Classification Search
CPC ............................ H05B 37/0272; G08C 17/02
USPC ............................................. 340/12.5–12.55
See application file for complete search history.

(56) References Cited

U.S. PATENT DOCUMENTS 5,239,205 A 8/1993 Hoffman et al.
6,771,182 B1 8/2004 Loh et al.
(Continued)

FOREIGN PATENT DOCUMENTS

WO 2015-200689 A1 12/2015

OTHER PUBLICATIONS

ISY-99i/ISY-26 INSTEON:Scene—Universal Devices, Inc. Wiki, accessed Jan. 26, 2015, retrieved from https://web.archive.org/web/20150605222033/http://wiki.universal-devices.com/index.php?title=ISY-99i/ISY-26_INSTEON:Scene, 6 pages.
(Continued)

Primary Examiner — Allen T Cao
(74) Attorney, Agent, or Firm — Kilpatrick Townsend & Stockton LLP

(57) ABSTRACT

Techniques and systems for wirelessly switching electrical power on and off are provided. The systems include in-wall network devices having a user-facing restore button for restoring some or all of the customizable settings to a factory default state. The systems include in-wall network devices having a user-facing restart button for temporarily removing power to at least a processing element of the network device to simulate disconnecting power from the in-wall network device.

20 Claims, 18 Drawing Sheets

Related U.S. Application Data

15/019,525, filed on Feb. 9, 2016, now Pat. No. 10,028,359, which is a continuation of application No. 14/750,786, filed on Jun. 25, 2015, now Pat. No. 9,713,231, which is a continuation-in-part of application No. 15/019,538, filed on Feb. 9, 2016, now Pat. No. 10,076,014, which is a continuation of application No. 14/750,786, filed on Jun. 25, 2015, now Pat. No. 9,713,231.

(60) Provisional application No. 62/018,171, filed on Jun. 27, 2014, provisional application No. 62/020,852, filed on Jul. 3, 2014, provisional application No. 62/024,902, filed on Jul. 15, 2014, provisional application No. 62/087,743, filed on Dec. 4, 2014, provisional application No. 62/087,647, filed on Dec. 4, 2014.

(56) References Cited

U.S. PATENT DOCUMENTS

| | | | |
|---|---|---|---|
| 7,498,952 | B2 | 3/2009 | Newman, Jr. |
| 7,933,213 | B1* | 4/2011 | Croak .................. H04L 43/024 |
| | | | 370/242 |
| 8,090,961 | B2 | 1/2012 | Yoffe et al. |
| 8,190,301 | B2 | 5/2012 | Voysey |
| 8,522,309 | B2 | 8/2013 | Yoffe et al. |
| 8,598,975 | B2 | 12/2013 | Miura |
| 8,598,978 | B2 | 12/2013 | Knode |
| 8,924,708 | B2 | 12/2014 | Yoffe et al. |
| 9,713,231 | B2 | 7/2017 | Kelly et al. |
| 9,892,630 | B1 | 2/2018 | Strods |
| 10,028,359 | B2 | 7/2018 | Kelly et al. |
| 10,076,014 | B2 | 9/2018 | Kelly et al. |
| 10,194,512 | B2 | 1/2019 | Strods et al. |
| 2003/0194912 | A1 | 10/2003 | Ferentz |
| 2006/0126617 | A1 | 6/2006 | Cregg et al. |
| 2007/0015416 | A1 | 1/2007 | Gutierrez et al. |
| 2008/0248684 | A1 | 10/2008 | Filipon et al. |
| 2009/0013210 | A1* | 1/2009 | McIntosh ............ H04L 41/0672 |
| | | | 714/4.1 |
| 2009/0251352 | A1 | 10/2009 | Altonen et al. |
| 2010/0073856 | A1* | 3/2010 | Huang ................... H04L 12/10 |
| | | | 361/679.21 |
| 2012/0044350 | A1 | 2/2012 | Verfuerth |
| 2012/0218211 | A1 | 8/2012 | McRae et al. |
| 2013/0184890 | A1* | 7/2013 | Li .............................. H02J 3/00 |
| | | | 700/293 |
| 2014/0032137 | A1* | 1/2014 | Gogoana ............. G01F 23/0069 |
| | | | 702/54 |
| 2014/0035464 | A1* | 2/2014 | Santos ............... H05B 37/0254 |
| | | | 315/130 |
| 2014/0204804 | A1* | 7/2014 | Lecourtier .............. H04L 45/06 |
| | | | 370/255 |
| 2014/0265881 | A1 | 9/2014 | Karc et al. |
| 2014/0321006 | A1* | 10/2014 | Huang ................... H02H 3/162 |
| | | | 361/49 |
| 2015/0005900 | A1 | 1/2015 | Steele et al. |
| 2015/0189725 | A1 | 7/2015 | Karc et al. |
| 2015/0382436 | A1 | 12/2015 | Kelly et al. |
| 2016/0066438 | A1 | 3/2016 | Malek et al. |
| 2016/0094616 | A1* | 3/2016 | Pinkerton ............. H04L 67/025 |
| | | | 702/188 |
| 2016/0174345 | A1 | 6/2016 | Kelly et al. |
| 2017/0013392 | A1 | 1/2017 | Bora et al. |
| 2018/0184152 | A1* | 6/2018 | Kirkpatrick ........ H04N 21/4126 |

OTHER PUBLICATIONS

SkylinkHome SK-8 Wireless Remote 3-Way On/Off Kit, dated Jan. 11, 2012, retrieved from https://web.archive.org/web/20120111095210/http://www.smarthome.com/73027/SkylinkHome-SK-8-Wireless-Remote-3-Way-On-Off-Kit/p.aspx, 1 page.

Leviton Anywhere Decora RF Remote 3-way switch kit: Home Improvement, dated May 21, 2010, retrieved from https://web.archive.org/web/20100521112749/http://www.amazon.com/Leviton-6696-W-Anywhere-Switch-Remote/dp/B00004YUOL, 5 pages.

Carlon HW2172 Battery Powered Wireless Wall Switch and Plug-In On/Off Module, dated Oct. 26, 2010, retrieved from https://web.archive.org/web/20101026131700/http://www.smarthome.com/25330/Carlon-HW2172-Battery-Powered-Wireless-Wall-Switch-and-Plug-in-On-Off-Module-White/p.aspx, 3 pages.

Sierra Tools JB5571 Battery-Operated Ceiling/Wall Light with Remote—Vanity Lighting Fixtures, dated May 23, 2014, retrieved from https://web.archive.org/web/20140523063320/http://www.amazon.com/Sierra-Tools-JB5571-Battery-Operated-Ceiling/dp/B002MYIPKE, 5 pages.

INSTEON Wireless Switch, dated Apr. 14, 2013, retrieved from https://web.archive.org/web/20130414000334/http://www.insteon.com/2342-x42-mini-remote.html, 2 pages.

SkylinkHome WE-318 On/Off Wall Switch Receiver with Snap-On Remote, dated Oct. 13, 2014, retrieved from https://web.archive.org/web/20141013125648/http://www.amazon.com/SkylinkHome-WE-318-Receiver-Snap-On-Installation/dp/B0052ROBZ6, 6 pages.

INSTEON: RemoteLinc 2 INSTEON Remote Control Keypad, 4 Scene (#2444a2xx4) Owners Manual (Oct. 24, 2011) XP055208459, Retrieved from http://cache.insteon.com/pdf/2444a2wh4.pdf, 15 pages.

International Search Report and Written Opinion dated Aug. 25, 2015 for International Patent Application No. PCT/US2015/037777, 11 pages.

Notice of Allowance dated Apr. 3, 2017 for U.S. Appl. No. 14/750,786, 9 pages.

First Action Interview Pilot Program Pre-Interview Communication dated Sep. 23, 2016 for U.S. Appl. No. 14/750,786, 4 pages.

Non-Final Office Action dated Sep. 8, 2017 for U.S. Appl. No. 15/019,538, 12 pages.

Pre-Interview First Office Action dated Feb. 24, 2017 for U.S. Appl. No. 15/019,525, 6 pages.

\* cited by examiner

NETWORK POWER SWITCH

CROSS-REFERENCE TO RELATED APPLICATIONS

This application is a continuation of U.S. patent application Ser. No. 15/852,958, filed on Dec. 22, 2017, which is a continuation-in-part of U.S. patent application Ser. No. 15/411,537, filed on Jan. 20, 2017 (now U.S. Pat. No. 9,892,630). U.S. patent application Ser. No. 15/852,958 is also a continuation-in-part of U.S. patent application Ser. No. 15/019,525 and U.S. patent application Ser. No. 15/019,538, both filed on Feb. 9, 2016 (now U.S. Pat. Nos. 10,028,359 and 10,076,014), and both continuations of U.S. patent application Ser. No. 14/750,786, filed on Jun. 25, 2015 (now U.S. Pat. No. 9,713,231). U.S. patent application Ser. No. 14/750,786, filed on Jun. 25, 2015 (now U.S. Pat. No. 9,713,231), claims the benefit of and priority to U.S. Provisional Application No. 62/018,171, filed on Jun. 27, 2014, U.S. Provisional Application No. 62/020,852, filed on Jul. 3, 2014, U.S. Provisional Application No. 62/024,902, filed on Jul. 15, 2014, U.S. Provisional Application No. 62/087,647, filed on Dec. 4, 2014, and U.S. Provisional Application No. 62/087,743, filed on Dec. 4, 2014. All of these applications are hereby incorporated by reference in their entireties for all purposes.

TECHNICAL FIELD

The present disclosure relates to network devices generally and more specifically to networked powered switches.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Techniques and systems for wirelessly switching electrical power on or off are provided. Disclosed system embodiments include in-wall network devices which incorporate a wireless antenna positioned outside of the wall to minimize or reduce interference with wireless transmissions due to supporting and structural components located in the wall. A configuration of the wireless antenna is selected to provide greater wireless coverage or longer wireless transmission range, thereby extending the utility of the disclosed systems for integration into a wireless network, such as a home wireless local area network.

For example, a position of a wireless antenna of an in-wall network device is selected to achieve optimal or desirable wireless propagation characteristics. In another example, an antenna design (e.g., shape, gain, type, etc.) and output power of an in-wall network device is selected to achieve optimal or desirable wireless propagation characteristics. These wireless antenna configurations optionally enable in-wall network devices to use minimal transmission output powers or minimal antenna gain to meet or exceed a desired or required wireless propagation distance. Alternatively, the wireless antenna configurations optionally allow in-wall systems to achieve longer wireless propagation distances without reducing output power or use of smaller antenna gain.

In a first aspect, provided herein are network devices. In one embodiment, for example, a network device comprises: a housing configured for mounting inside of an electrical box, wherein the housing includes a room-facing wall and an electrical box-facing wall; a circuit board having a data processor and a wireless transceiver, wherein the circuit board is positioned within the housing; a relay configured to control a power state of an electrical device, wherein the data processor is configured to open or close the relay; electrical terminals configured to connect to line power, such as a building electrical supply, to provide power to the circuit board and to provide switchable power to the electrical device through the relay, wherein the electrical terminals are coupled to the electrical box-facing wall of the housing; and a wireless antenna connected to the wireless transceiver by a transmission line. In a first exemplary embodiment, the wireless antenna is mounted on the room-facing wall of the housing. In a second exemplary embodiment, the wireless antenna is positioned outside the electrical box when the housing is mounted inside the electrical box. In a third exemplary embodiment, the wireless antenna is positioned to reduce or minimize interference with a wireless or radio frequency transmission between the wireless antenna and a remote wireless device due to the electrical box and due to wall and building materials proximate to the electrical box. These exemplary configurations may optionally be combined with one another and any of the other network device configurations disclosed herein. These configurations generally provide the ability for wireless signals transmitted by the network device to be received at distances further than if the antenna were positioned within the electrical box or behind or adjacent to a variety of wall components (e.g., sheet rock, plaster, studs, electrical wiring, conduit, etc.).

In embodiments, "a housing configured for mounting inside of an electrical box" refers to a structure having a size and shape which can be inserted into an electrical box, also commonly referred to as a switch box, device box, wall box or pattress box and which optionally includes holes for inserting screws through to attach the housing to the electrical box.

In certain embodiments, multiple wireless antennas are provided. Use of multiple antennas are useful, for example, for wireless configurations where multiple frequencies are used (e.g., 2.4 GHz and 5 GHz) or for MIMO configurations. For example, in one embodiment, the wireless antenna comprises a first wireless antenna mounted to transmit with a first polarity and a second wireless antenna mounted to transmit with a second polarity. Optionally, the first polarity and the second polarity are different. For example, in one embodiment, the first polarity is vertical and the second polarity is horizontal.

Useful wireless antenna types include, but are not limited to, inverted F antennas, microstrip patch antennas, directional antennas, arrays thereof and combinations thereof. In an exemplary embodiment, the wireless antenna exhibits a gain of less than 8 dBi. Useful antenna gains include those in excess of 5 dBi and those in the range of 3 dBi to 15 dBi. In an exemplary embodiment, the wireless transceiver exhibits a maximum output power of 0.5 W. For some embodiments, the wireless transceiver exhibits a maximum output power of 0.05 W. Useful transceiver maximum output power includes those in the range of 0.1 W to 1.0 W. In general, the maximum output power that the wireless transceiver can transmit is limited by local regulations, such as FCC Part 15 in the U.S.

Optionally, the room-facing wall of the housing includes a switch, such as a switch configured to provide an instruction to the data processor to open or close the relay to change the power state of the electrical device. Useful switches include, but are not limited to, rocker switches, push-button switches, touch sensitive switches, touchscreens and the like. In embodiments, the electrical device is a remotely located device, such as an electrical outlet, an electrical socket or a light fixture. In one embodiment, the electrical device is an electrical outlet located in the room-facing wall of the network device. In embodiments, the wireless antenna is mounted on the switch, such as on an electrical box-facing surface of the switch. As used herein, the term "room-facing wall" refers to an outer portion of a device component or device housing that is configured to be user-facing or face out from the wall of a building or structure when mounted in an in-wall electrical box. Conversely, the term "electrical box-facing wall" refers to an outer portion of a device component or device housing that is configured to face the interior of a wall of a building or structure when the device is mounted in an in-wall electrical box. In embodiments, an electrical box-facing wall of a device is physically surrounded by an electrical box when mounted in the electrical box, such as an electrical box as commonly used in modern construction for mounting and supporting a light switch or electrical outlet, such as a NEMA AC power receptacle.

In some embodiments, the network device further comprises or is covered by a cover plate, such as a cover plate configured to cover at least a portion of the room-facing wall of the housing. For example, a useful cover plate optionally comprises a conventional cover plate, wall plate or switch plate used for concealing the in-wall electrical box and electrical wiring associated with a light switch or an electrical outlet. Optionally, the cover plate comprises a portion of the housing of the network device. In some embodiments, the cover plate is a separate component, attachable to the housing of the network device. Optionally, the wireless antenna is positioned on a room-facing surface of the housing and is covered or configured to be covered by a cover plate. In various embodiments, a non-metallic or non-conducting cover plate is preferred, as metallic and conducting cover plates can potentially interfere with wireless transmissions to and from the wireless antenna. For example, in embodiments, the cover plate comprises plastic.

For various embodiments, a cover plate useful with the network devices disclosed herein includes a cover plate comprising an external wireless antenna. For example, in one embodiment, the wireless antenna of the network device is mounted on an electrical box-facing or wall-facing surface of the cover plate. For example, in an exemplary embodiment, the cover plate is configured to attach to the housing and to connect the wireless antenna to the wireless transceiver through the housing. A variety of techniques are useful for connecting the wireless antenna to the wireless transceiver through the housing. For example, in one embodiment, the transmission line comprises a shielded cable that passes through the housing. In another embodiment, a connector is mounted on a wall of the housing, such as a coaxial connector. Such configurations advantageously provide for the ability to maintain a shielded transmission line between the wireless antenna and the wireless transceiver. In some embodiments, however, a twisted pair transmission line, one or more electrical contacts and/or one or more pin/socket pairs are used to pass the transmission line through the housing.

In various embodiments, the network device is configured to perform steps of a method. For example, in one embodiment, the network device is configured to open or close the relay to change a power state of the electrical device. In another embodiment, the network device is configured to receive an instruction to open or close the relay to change a power state of the electrical device and open or close the relay in response to the instruction, in order to change the power state of the electrical device. Optionally, the network device is configured to send a signal to a remote system indicating the power state of the electrical device. Optionally, the network device is configured to send a signal to a remote system indicating a position of the relay. Optionally, the network device is configured to send a signal to a remote system indicating a status of the network device.

In another aspect, provided herein are methods. For example, methods are provided for wirelessly changing a power state of an electrical device. The disclosed methods optionally include use of the network devices described herein, such as those network device incorporating a wireless antenna. A specific method embodiment of this aspect comprises: providing a network device, such as a network device described herein, receiving an instruction to open or close a relay of the network device to change a power state of an electrical device; and opening or closing the relay in response to the instruction. Optionally, methods of this aspect further comprise sending a signal to a remote system indicating the power state of the electrical device. Optionally, methods of this aspect further comprise sending a signal to a remote system indicating the power state of the electrical device. Optionally, methods of this aspect further comprise sending a signal to a remote system indicating a position of the relay of the network device.

Another method embodiment comprises providing a network device, such as a network device described herein comprising a wireless antenna; and sending a signal to a remote system. An exemplary method embodiment of this aspect further comprises a step of increasing an output transmission power based on a lack of confirmation of receipt of the signal from the remote system and resending the signal to the remote system. In another embodiment, the network device comprises multiple wireless antennas and the method comprises sending a first signal to a remote system using a first wireless antenna, and sending a second signal to the remote system using the second wireless antenna based on a lack of confirmation of receipt of the first signal from the remote system. Using these methods, wireless network devices can attempt to resend signals to a remote system using different wireless antennas or different output power settings if a signal is not confirmed as received by the remote system. Such a configuration is useful, for example, if the network device includes an internal wireless antenna, such as a wireless antenna located on a circuit board within a housing of the network device, and an external wireless antenna, such as a wireless located on a room-facing wall of the housing of the network device or on a cover plate attached to the network device. Thus, the networks device can switch to a backup antenna or antenna providing better propagation characteristics in case of failure of transmission from the primary or internal antenna.

Another embodiment includes a network device having a user-facing restore button and a user-facing restart button.

The restore and restart buttons can be accessible when a cover plate is installed, or can be covered by a cover plate. The restore and restart buttons can be located on a bezel surrounding a main switching element.

Another embodiment includes one or more light sources located within the network device that provide displays located on a user-facing surface of the network device, such as on the main switching element. The displays can provide a user with information about the power state, network connectivity status, and physical location (e.g., a light indicating presence of the network device in a darkened room) of the network device.

Another embodiment includes a set of bridge rectifiers coupled between a power supply of the network device and the line connection and load connection of the network device. The dual bridge rectifiers can allow the network device to receive power and operate despite being installed incorrectly with the line and load connections reversed.

The foregoing, together with other features and embodiments, will become more apparent upon referring to the following specification, claims, and accompanying drawings.

BRIEF DESCRIPTION OF THE DRAWINGS

The specification makes reference to the following appended figures, in which use of like reference numerals in different figures is intended to illustrate like or analogous components

DETAILED DESCRIPTION

Figure 1:
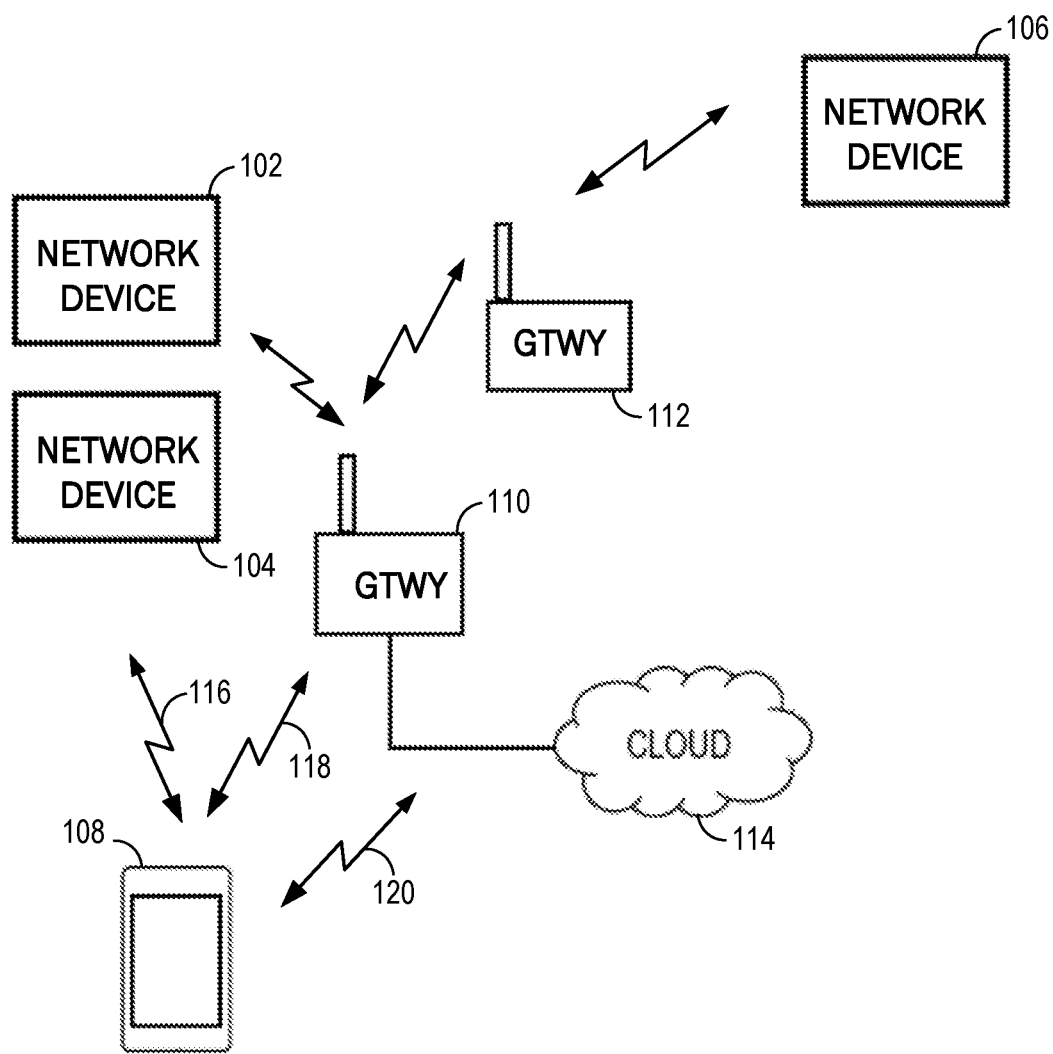
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. As explained herein, techniques are provided that allow generation of a single logical network in a local area network, thus preventing multiple logical networks from being associated with the local area network. These techniques allow a user, whether located locally or remotely from the local area network, to access all network devices in the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Accordingly, techniques and systems are described herein for identifying a primary gateway and generating a logical network using credentials of the primary gateway. Accordingly, a single logical network may be generated for a local area network. Whether located locally or remotely, a user may thus access all network devices in the local area network using the single logical network.

Aspects of the present disclosure further relate to a network power switch having a user-facing restore button for restoring settings on the network power switch. The restore button can remove any customizable settings, such as wireless access settings (e.g., SSID, password, and others), network IDs, security keys, built-in rules, stored names and/or images, user settings, and other information. Customizable settings can be stored in any memory of the network device, as described below. The restore button can be used to remove any information necessary for the network power switch to connect and/or function on the wireless network to which it was previously connected. The restore button can be used to restore the network power switch to its factory default settings. The restore button can respond to various patterns of being pressed, such as press-and-hold, multiple-press, multiple-press-then-hold, or any other suitable pattern of being pressed. In some embodiments, different patterns of being pressed will result in the erasure of different information. As used herein, the term "erase" can include removing customized settings and restoring a device to its factory default settings. In some embodiments, the restore button can be located behind a cover plate. In some embodiments, the restore button can be located along a frame of one or more main switching elements (e.g., a toggle switch or a momentary switch).

In some embodiments, depressing the restore button for a predetermined length of time (e.g., five seconds) will erase the provisioning information on the network power switch and revert the network power switch to default factory settings wherein the network power switch establishes itself as a WiFi hotspot to which other network devices may connect in order to program and/or use the network power switch.

In some embodiments, the network power switch further includes a user-facing restart button for restarting any processing elements within the network power switch. When pressed, the restart button can temporarily remove power to one or more processing elements of the network power switch and/or to the entire network power switch. The restart button can additionally provide a signal to a processing element to restart without cutting power to the processing element (e.g., a logic restart). In some embodiments, the restart button removes power and/or holds a processor in restart for the duration of the button being pressed. In other embodiments, the restart button can respond to various patterns of being pressed, such as press-and-hold, multiple-press, multiple-press-then-hold, or any other suitable pattern of being pressed. In some embodiments, the restart button can be located behind a cover plate. In some embodiments, the restart button can be located along a frame of one or more main switching elements (e.g., a toggle switch or a momentary switch).

In some embodiments, the functionalities of the restart button and the restore button can be collocated on a single button responsive to different patterns of button presses.

As used herein, restart and restore buttons can include a pressure-sensitive button, a capacitive-sensitive button, a "soft" button on a touchscreen, or any other suitable user-actuatable element.

In some embodiments, the network power switch includes one or more display elements located underneath the main switching element. The one or more display elements can include a power light indicative of the state (e.g., open or closed) of the network power switch. The one or more display elements can include a wireless connectivity light indicative of the connection status and/or signal of the wireless network connection. The one or more display elements can further include a night light that glows to indicate the presence of the network power switch in dark ambient conditions. Other information can be displayed to a user through the one or more display elements.

The one or more display elements can be located behind the cover or optionally located behind the main switching element. In some embodiments, a transparent lens can be placed in the cover or main switching element to allow light to pass from a display element to the user. In some embodiments, the cover or main switching element includes or is made entirely from a translucent material through which light from the display element can pass. In some embodiments, masks can be used to block light and provide a desired shape (e.g., icon) to the light presented to the user. In some embodiments, light tunnels can be used to focus light from the display element (e.g., an LED light) to the desired location on the cover and/or main switching element. In some embodiments, the display elements can be multicolor in order to display different colors to a user based on user-customization and/or based on particular information desired to be imparted on the user (e.g., a red color may be indicative of no connection and a yellow color may be indicative of a weak connection).

The network power switch can accept a neutral input, a line input, and a load input. In some embodiments, the network power switch includes a bridge rectifier circuit positioned on each of the load input and the line input. Power can thus be supplied to the network power switch (e.g., to power its internal processor) regardless as to whether the line and load are miswired. For example, when the network power switch is properly installed, the network power switch's internal processor may be powered from current supplied across the line and neutral inputs. In other examples, when the network power switch is improperly installed such that the actual load (e.g., a lamp) is wired to the line input and the building's line is wired to the load input, the bridge rectifiers allow the network power switch's internal processor to be powered form current supplied across the load and neutral inputs.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, and/or any other wireless network transceiver radio or interface that allows the IoT device to communicate with a wide area network and with one or more other devices. In some embodiments, an IoT device does not include a cellular or other broadband network transceiver radio or interface, and thus may not be configured to directly communicate with a broadband network. In some embodiments, an IoT device may include a cellular or broadband network transceiver radio, and may be configured to communicate with a broadband network using the broadband network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or the like), or the like. In some embodiments, the access device 108 may include a cellular or broadband network transceiver radio or interface, and may be configured to communicate with a broadband network using the broadband network transceiver radio. In some embodiments, the access device 108 may not include a cellular or broadband network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, cellular, long-term evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards), or other wireless communication technologies, or any combination thereof. Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
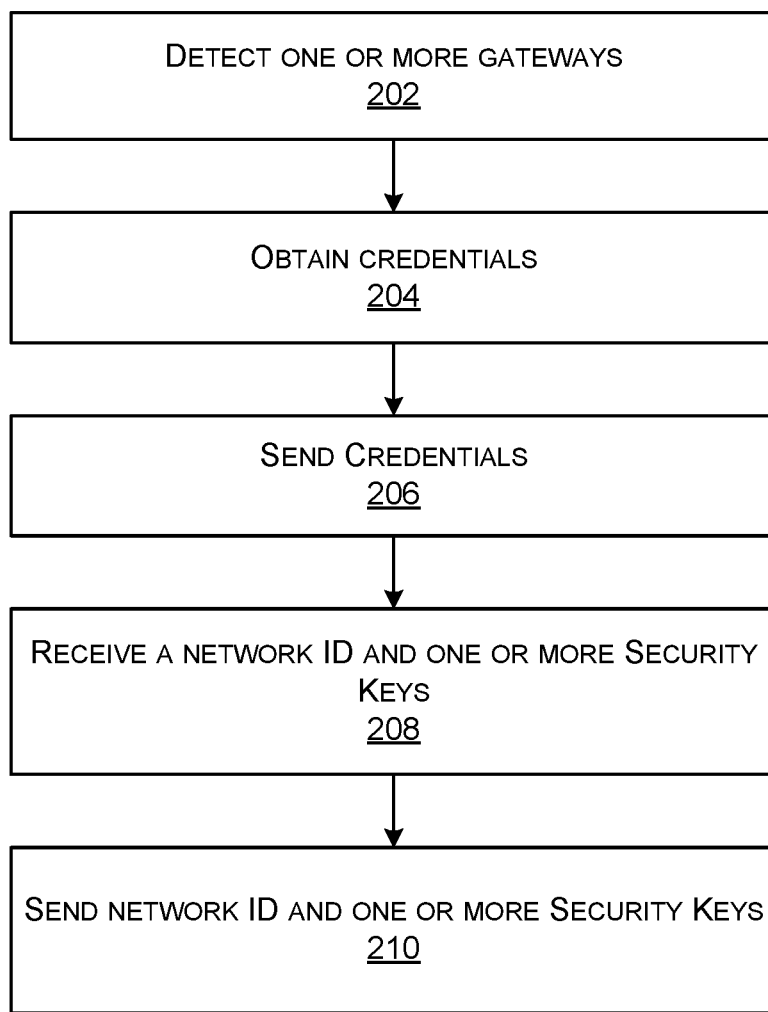
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization="SDU UniqueId":"Signature":"ExpirationTime". The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the network device to push its change in in status to the cloud network 114 for storage or updating of the cloud's stored status table. In another embodiment, cloud network 114 and/or gateway 110 may continuously (or periodically) communicate with each network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status (es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 114, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

In various embodiments, the network devices 102, 104, 106 provide for control over a power state or any or all user inputs on appliances and other electronic devices, such as, for example, those implemented by the appliance or device manufacturer. For example, in embodiments, the network device 102, 104, 106 may incorporate and permit control over variable settings of home appliances and electronic devices. For example, a temperature setting on a thermostat, such as in a heating/cooling system or in a cooking or refrigeration appliance, can be controlled by a network device 102, 104, 106. Similarly, network devices 102, 104, 106 may permit control over a volume level of a stereo, speaker or other audio device. In another embodiment, a lighting level can be controlled by network devices 102, 104, 106. For example, network devices 102, 104, 106 can allow for control over an intensity, color output, dim level or number of illuminated light bulbs, lamps, LEDs, etc. Network devices 102, 104, 106 can also be used to control devices which implement motors or actuators. For example, network devices 102, 104, 106 can control a motor to adjust a position of an object, such as to open, close or move a door (e.g., garage door), a window, window blinds or shades, an awning or to raise or lower a curtain, projection screen, etc. Network devices 102, 104, 106 can also provide variable control of a speed of a motor, for example, to allow for control over fan speed, such as for an oscillating fan or ceiling fan, control over blower speed, such as in an HVAC system, or control over pump speed, such as for pumping water or other fluids. Network devices 102, 104, 106 can also provide control over multiple distinct states of devices, such as devices which incorporate multiple level settings, such as off-high-medium-low (e.g., oscillating fans, slow cooker, etc.).

In some embodiments, network devices 102, 104, 106 incorporate one or more sensors. For example, in one embodiment the network devices 102, 104, 106 include a temperature sensor. In another embodiment, the network devices 102, 104, 106 include an audio sensor (e.g., microphone). In another embodiment, the network devices 102, 104, 106 include a pressure sensor. In another embodiment, the network devices 102, 104, 106 include a motion sensor. In another embodiment, the network devices 102, 104, 106 include an optical sensor. In another embodiment, the network devices 102, 104, 106 include includes a hygrometer. Incorporation of one or more sensors into the network devices 102, 104, 106 is advantageous as doing so provides the network devices with the ability to report the sensor's measurements to one another and other network devices, servers, gateways or access devices. In addition, the network devices 102, 104, 106 can utilize the sensor measurements to provide further control over electronic devices, such as appliances. For example, the sensor measurements can be used in one or more user implemented rules, such as to permit automatic control over an electrical device or appliance. For example, including a temperature sensor in a network device optionally provides the ability to turn off or on a device, such as an air conditioner or heater, when a measured temperature falls below or rises above a specified temperature. Similarly, a network device including an audio sensor can be programmed to automatically control a volume level of a stereo, speaker or other audio device if the detected audio level falls below or rises above a specified threshold. In a similar way, lighting levels can be controlled by a network device incorporating an optical sensor, such as to automatically turn off or on lights or to adjust a dim level based on a sensed lighting level. In other embodiments, the sensed condition can control other devices not normally associated with the sensed condition. For example, a temperature sensor can be used to program control over an audio level; or a pressure sensor can be used to trigger control over a lighting level. In addition, the sensors can be used by the network devices to alert the user when a threshold sensor level is passed, such as to provide an indication to the user when the temperature rises above or falls below a specified temperature. In this way, a multitude of triggers and control combinations can be provided.

In further embodiments, a touch screen display, is provided one or more of network devices 102, 104, 106, for example to allow a multitude of user inputs, such as to control and program network devices 102, 104, 106. Including a touch screen display on one or more network devices 102, 104, 106, for example, optionally provides for the ability to simultaneously use network device 102, 104, 106 as both a network device and an access device 108.

Figure 3:
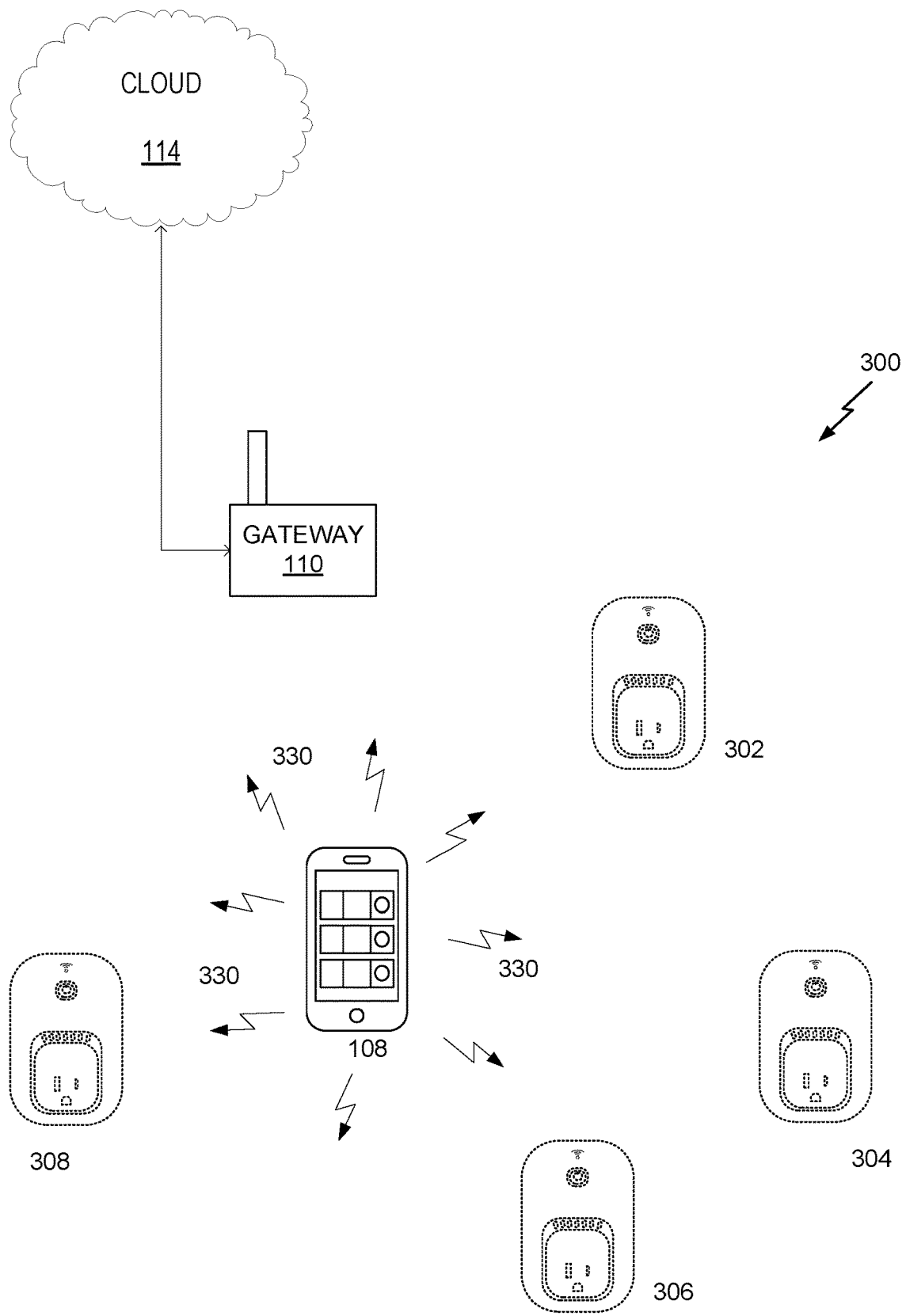
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered the an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g. ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
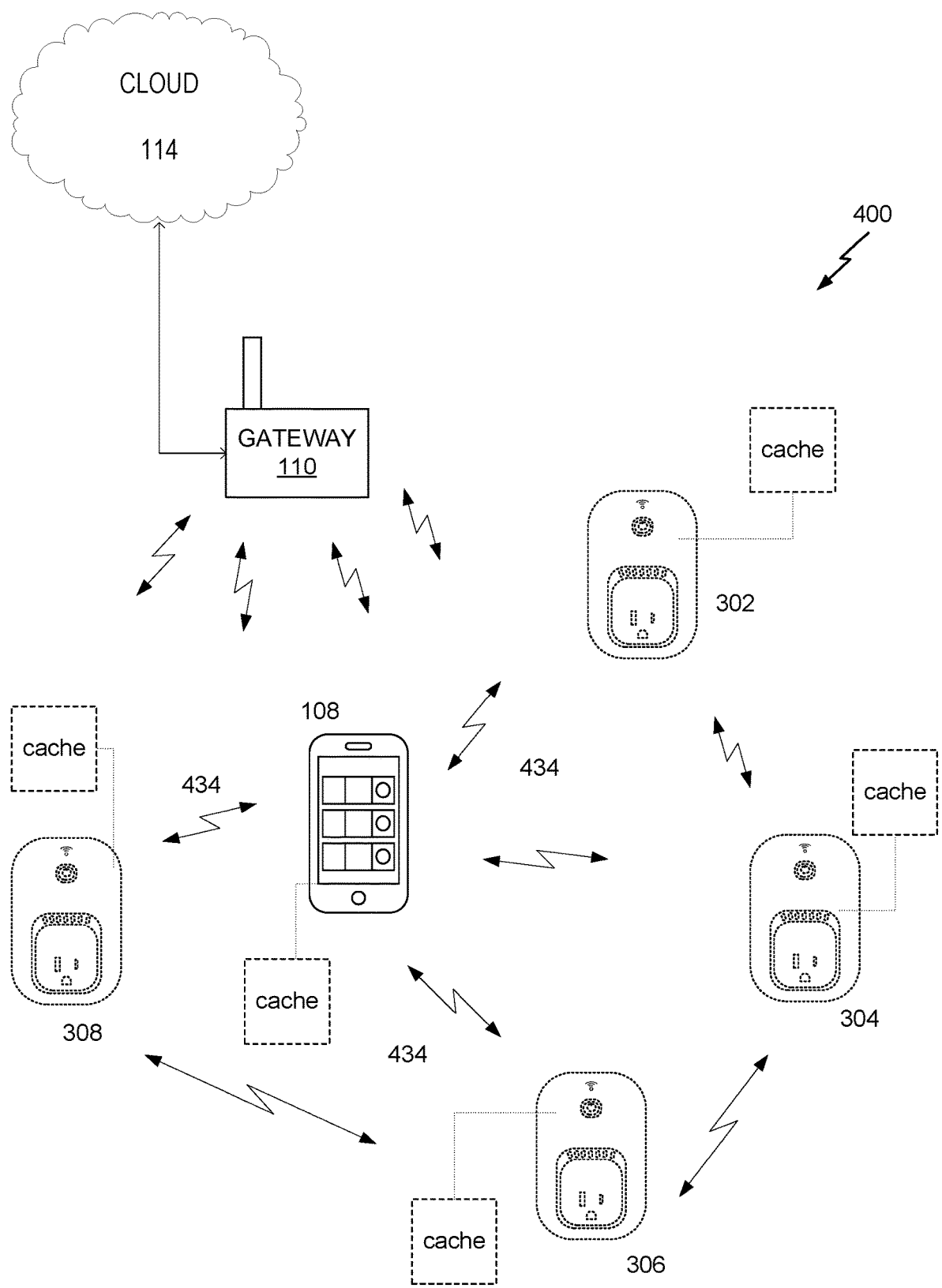
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network 400 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
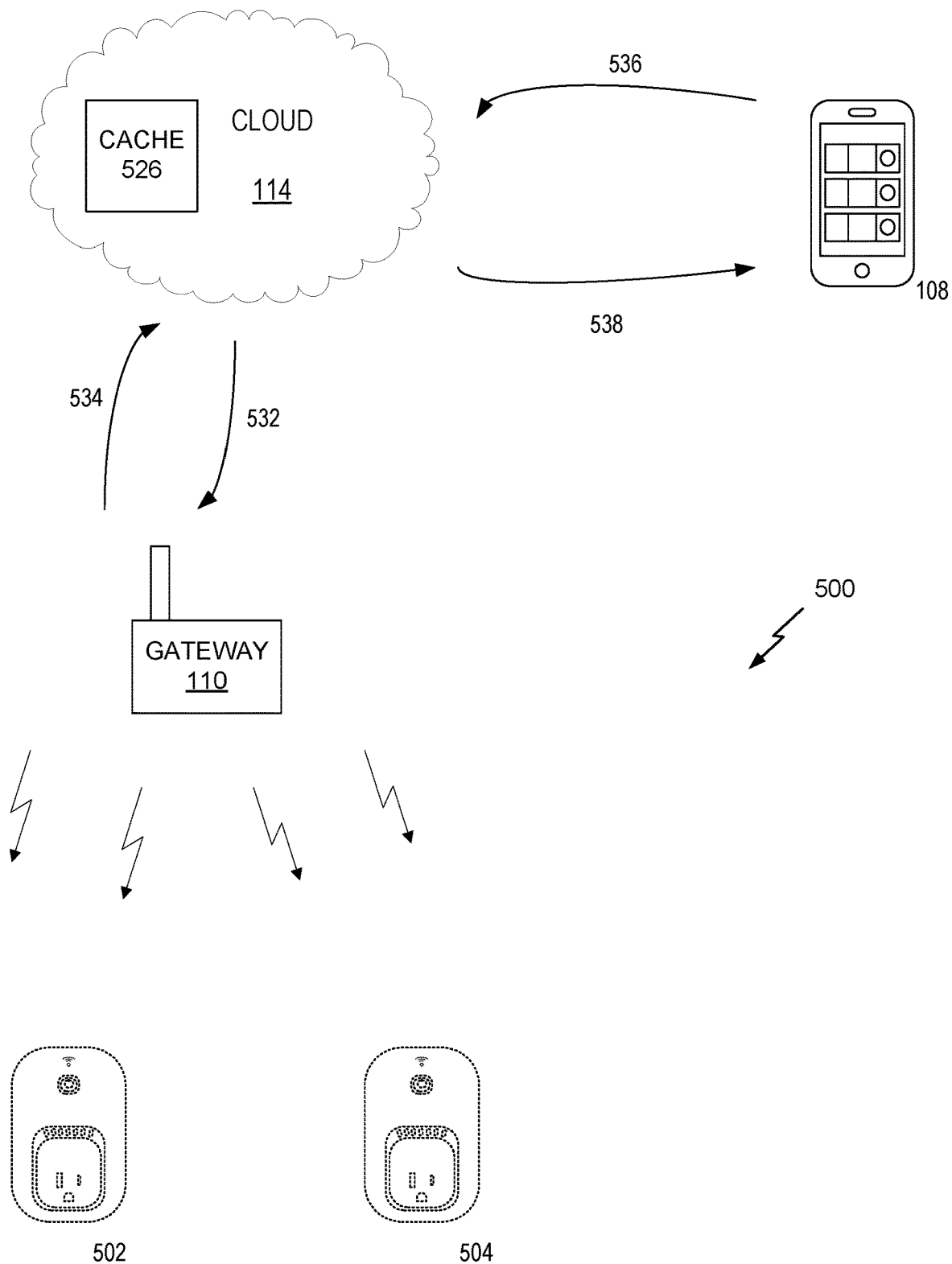
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data (e.g., via communication 534) from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
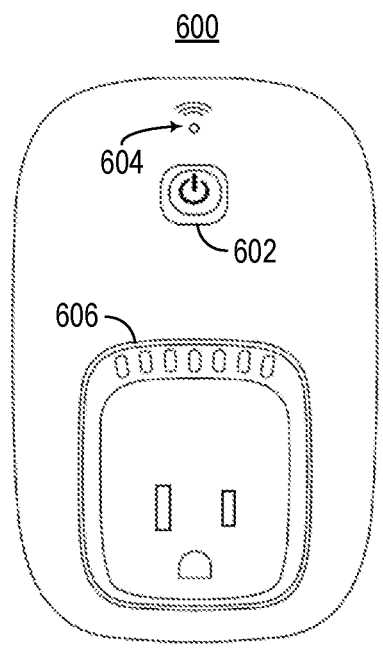
FIG. 6 is an illustration of an example of a front view of a network device, in accordance with an embodiment.
Figure 7:
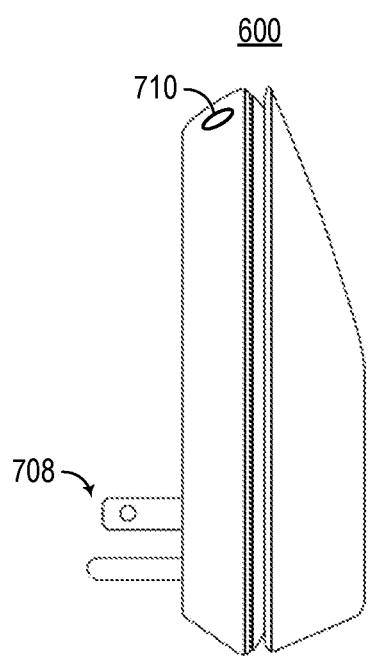
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/ g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes a power button 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 for connection to line power (e.g., an electrical supply) and an outlet 606 for connecting an electrical device. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the outlet 606 may be controlled by a user using an access device (e.g., access device 108).

Figure 8:
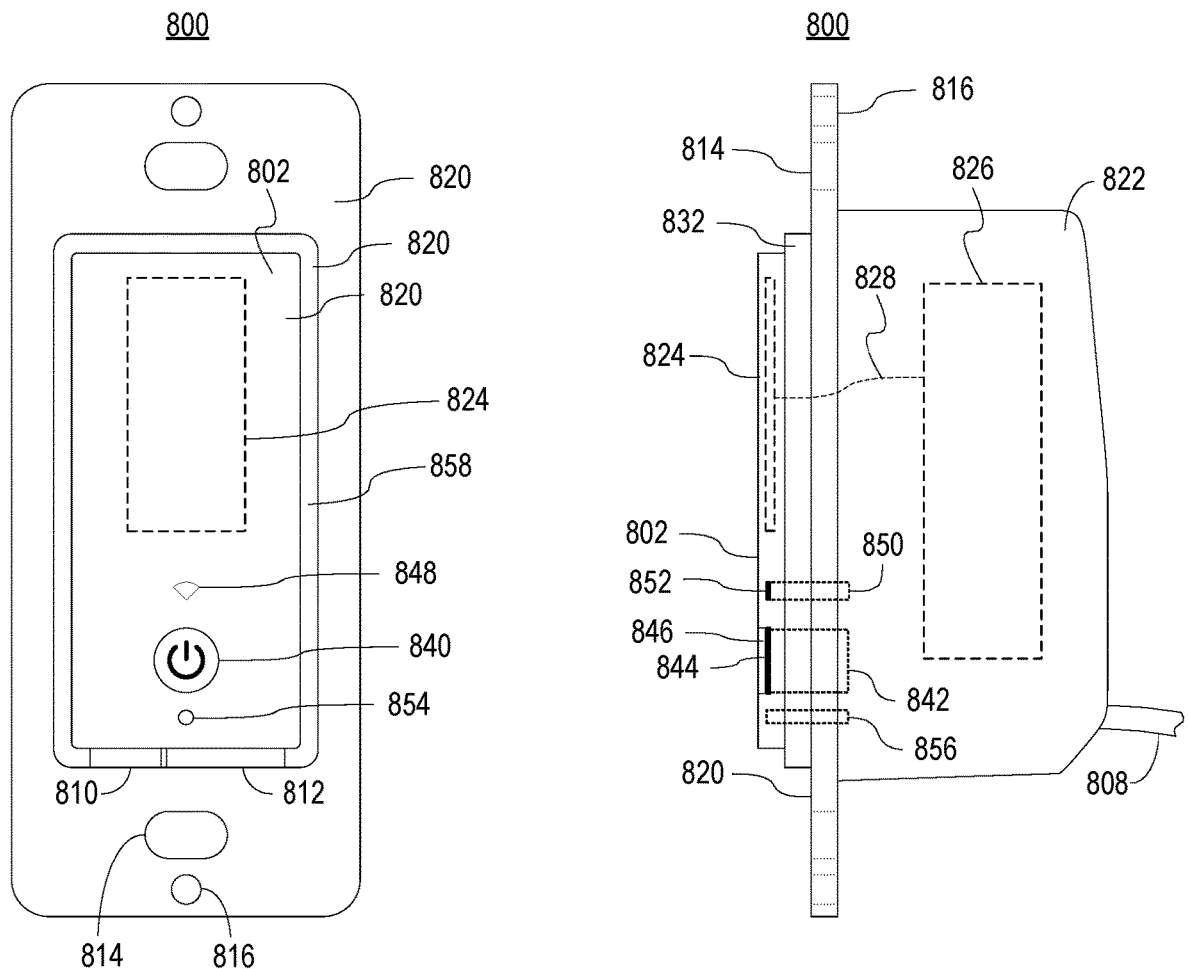
FIG. 8 is an illustration of an example of front and side views of a network device, in accordance with an embodiment.

FIG. 8 illustrates example views of a network device 800, with the left panel showing a front view and the right panel showing a side view. Network device 800 is stylized as an in-wall light switch style structure. The network device 800 may include any of the network devices 102, 104, or 106 described herein. In some embodiments, the network device 800 may be a home automation network device. For example, the network device 800 may include a home automation switch that may be coupled with a home appliance. A user may access the network device 800 in order to control, and/or configure various home appliances located within the user's home. The user may access the network device 800 remotely (e.g., wirelessly). For instance, the user may remotely control appliances such as a television, radio, light, microwave, iron, space heater, wall A/C unit, washer, dryer, fan, and/or the like.

In some embodiments, the network device 800 may include a WiFi enabled switch that connects home appliances and other electronic devices to a compatible 802.11b/g/n/ac WiFi network. The network device 800 may thus allow users to locally or remotely turn devices on or off from anywhere, program customized notifications, and/or change device status, position, speed or level, among other types of control. The network device 800 may further allow a user to create custom schedules or have devices respond to sunrise or sunset, indoor or outdoor temperature, audio level, light level, sensor conditions, etc.

The network device 800 can include a main switching element 802 (e.g., a power switch) that may be depressed in order to change a power state of an electrical device drawing power through network device 800. In the embodiment shown in FIG. 8, main switching element 802 is configured similar to a decorator style rocker switch, but with a push-button (e.g., momentary) configuration instead of a two-state (i.e., on/off) configuration. Other configurations of a main switching element 802 can be used. The room-facing wall 820 can include one or more main switching elements 802, some of which may be used to send a wireless signal and/or command from the network device 800 instead of used to change the power state of an electrical device drawing power through the network device 800.

In some embodiments, one or more light sources, such as a light-emitting diode (LED), may be integrated with or located behind the room-facing wall 820, such as behind a main switching element 802. Any display can be presented using a light source and optionally one or more of a light pipe to direct the light source, a mask to provide a user-recognizable pattern to the light source, and a lens.

For example, a power display 840 can be illuminated to indicate that the network device 800 is providing power to the electrical device and can be turned off to indicate no power is being provided to the electrical device. The power display 840 can comprise a light source located on a circuit board under the main switching element 802, and can optionally include one or more of a light pipe 842, a mask 844, and a lens 846.

The light pipe 842 can be used to keep excess light from spilling in undesired directions. The light pipe 842 can be a hollow piece of black plastic, a fiber optic tube, or any other suitable structure. The mask 844 can block portions of the light source in order to create a pattern. For example, the mask 844 of a power display 840 can be shaped to give the light a user-recognizable power button shape. The mask 844 can be incorporated into the lens 846. The lens 846, with or without a mask 844, can be incorporated into room-facing wall 820, such as the main switching element 802.

The network device 800 can include a network status display 848 that provides information about the status of the network device's 800 network connectivity, such as wireless connectivity and signal strength. The network status display 848 can include a light source, a light pipe 850, and a mask 852. The mask 852 can provide a shape to the light, such as the shape of concentric arcs gradually increasing in size, signifying radiating radio waves. Without a lens or other opening, the light from the network status display 848 can pass through translucent material of the room-facing wall 820, such as the main switching element 802. The light source may depict different colors or other characteristics (e.g., flashing, dimming, or the like) to indicate different levels of signal strength or mode of operation.

The network device 800 can include a nightlight display 854. The nightlight 854 can be illuminated whenever the electrical device is turned off or whenever the electrical device is turned off and the ambient light is below a preset level. The nightlight display 854 can include a light source and a light pipe 856. In some embodiments, the nightlight 854 may not have a light pipe 856, and can illuminate a larger portion of the room-facing wall 820, such as a larger portion of the main switching element 802.

Because the various displays (e.g., power display 840, network status display 848, nightlight display 854, and others) can be located anywhere on the room-facing wall 820, the displays can be located on the main switching element 802 (e.g., as shown in FIG. 8), inline with a bezel 858, through a cover, or elsewhere visible to a user when the network device 800 installed.

In some embodiments, each display can include one or more light sources capable of providing one or more colors of light (e.g., a bicolor LED).

In some embodiments, a variable level switch, such as a dimmer type switch, is provided on room-facing wall 820 of network device 800. In further embodiments, a touch screen display, is provided on room-facing wall 820 of the network device 800, such as to allow a multitude of user inputs, such as to control and program network device 800. Including a touch screen display on network device 800, for example, optionally provides for the ability to use network device 800 as both a network device (102, 104, 106) and an access device 108.

The network device 800 includes a restore button 810. The restore button 810 may allow a user to reset the network device 800 to factory default settings. For example, upon being depressed, the restore button 810 may cause all software on the device to be reset to the settings that the network device 800 included when purchased from the manufacturer. Resetting these settings to factory default can include removing wireless access settings (e.g., SSID, password, and others), network IDs, security keys, saved rules, stored names and/or images, user settings, and other information.

In some embodiments, the restore button 810 can respond only to certain predetermined patterns of being depressed, such as press-and-hold, multiple presses, or multiple presses and hold. In some embodiments, the restore button 810 can respond to different patterns of being depressed with different results, such as restoring the network device 800 to factory defaults when the button is pressed and held for a certain length of time (e.g., five seconds), but only removing the wireless access settings (e.g., not removing saved rules, stored names, and/or stored images) when the button is pressed five times in quick succession and then held for ten seconds. In some embodiments, the restore button 810 can be used to only reset the user-defined rules and/or other user-defined settings of the network device 800, without removing any wireless access settings, for example if a user desired to use the network device 800 within the same network, but for a different purpose (e.g., moving the network device 800 to a different room).

The restore button 810 can be located on the room-facing wall 820 such that the button is readily accessible by a user while the network device 800 is installed in a wall. In one embodiment, the restore button 810 is located inline with a bezel 858. The restore button 810 can be shaped to follow the contour and shape of the bezel 858 so as to remain unobtrusive. The main switching element 802 can extend past the bezel 858 so that the restore button 810 is not inadvertently pressed.

The network device 800 also includes a restart button 812. The restart button 812 may allow a user to cycle the power of network device 800. For example, upon being depressed, the restart button 812 may cause the network device to reboot, simulating disconnection from and reconnection to line power (e.g., an electrical supply). In some embodiments, the restart button 812 can physically disconnect power to one or more elements (e.g., processors) of the network device 800. In other embodiments, the restart button 812 can simply provide a reset signal to one or more elements (e.g., processors) of the network device 800 to cause such elements to restart.

The restart button 812 can be located on the room-facing wall 820 such that the button is readily accessible by a user while the network device 800 is installed in a wall. In one embodiment, the restart button 812 is located inline with the bezel 858. The restart button 812 can be shaped to follow the contour and shape of the bezel 858 so as to remain unobtrusive. The main switching element 802 can extend past the bezel 858 so that the restart button 812 is not inadvertently pressed.

The restore button 810 and restart button 812 can each be located on a user-facing surface (e.g., the room-facing wall 820) of the network device when the network device is recessed in a structure (e.g., mounted in a wall or in an electrical box).

The network device 800 further includes electrical terminals 808, here depicted as wires extending from the back of network device 800 and coupled to electrical box-facing wall 822, for connection to line power, for providing electrical power to network device 800, and for providing switchable electrical power to an electrical device. In embodiments, a variety of electrical terminals are useful, including electrical wires, screw terminals, barrier terminals, push-in terminals and the like. Various electrical codes may dictate which electrical terminal types are required or permitted for network device 800. Electrical terminals 808 allow the network device 800 to be connected to line power providing 120V, 220V, or the like. In turn, an electrical device, such as an outlet, socket, light fixture or appliance, may be connected to network device 800. Once the network device 800 is registered according to the techniques described above, a power state or other controllable aspects of the electrical device connected to the network device 800 may be controlled by a user using an access device (e.g., access device 108).

The network device 800 includes a housing configured to be installed in an electrical box, similar to the placement of conventional light switches and electrical outlets. Mounting apertures 814 are included for attaching the network device 800 to an electrical box, such as an electrical box located inside a wall. Cover plate apertures 816 are included for attaching a wall plate over network device 800, similar to the attachment of a switch/wall plate over a conventional light switch or electrical outlet. The front view of the network device 800 in the left panel of FIG. 8 shows room-facing wall 820 of network device 800. Room-facing wall 820 of the network device 800 and electrical box-facing wall 822 of the network device 800 are both shown in the right panel of FIG. 8.

The network device 800 includes a wireless antenna 824 mounted on room-facing wall 820. In the embodiment shown, the wireless antenna 824 is positioned below the main switching element 802, so the wireless antenna 824 is not visible to a user when looking at the room-facing wall 820 of network device 800. A circuit board 826 is positioned within network device 800 to include various components, such as a data processor and wireless transceiver. A transmission line 828 connects the wireless antenna 824 to the wireless transceiver on the circuit board 826. In embodiments, the transmission line 828 is a coaxial cable, providing an electrically shielded radio frequency transmission line between the wireless antenna 824 and the wireless transceiver. When network device 800 is mounted in an electrical box placed in a wall, the wireless antenna 824 can be positioned at least partially in front of a plane defined by the room-facing surface of the wall. This configuration can provide the network device 800 with the capability of reducing or minimizing interference for wireless transmissions between the wireless antenna 824 to a wireless access point, gateway or other wireless device due to the wall, electrical box or associated building materials.

In some embodiments, the wireless antenna 824 can be a three-dimensional wireless antenna. The three-dimensional wireless antenna can provide superior reception of polarized radio signals. In some embodiments, multiple wireless antennas, that are positioned a distance apart, can be used to improve upon reception when one of the antennas is located in a null path.

Figure 9:
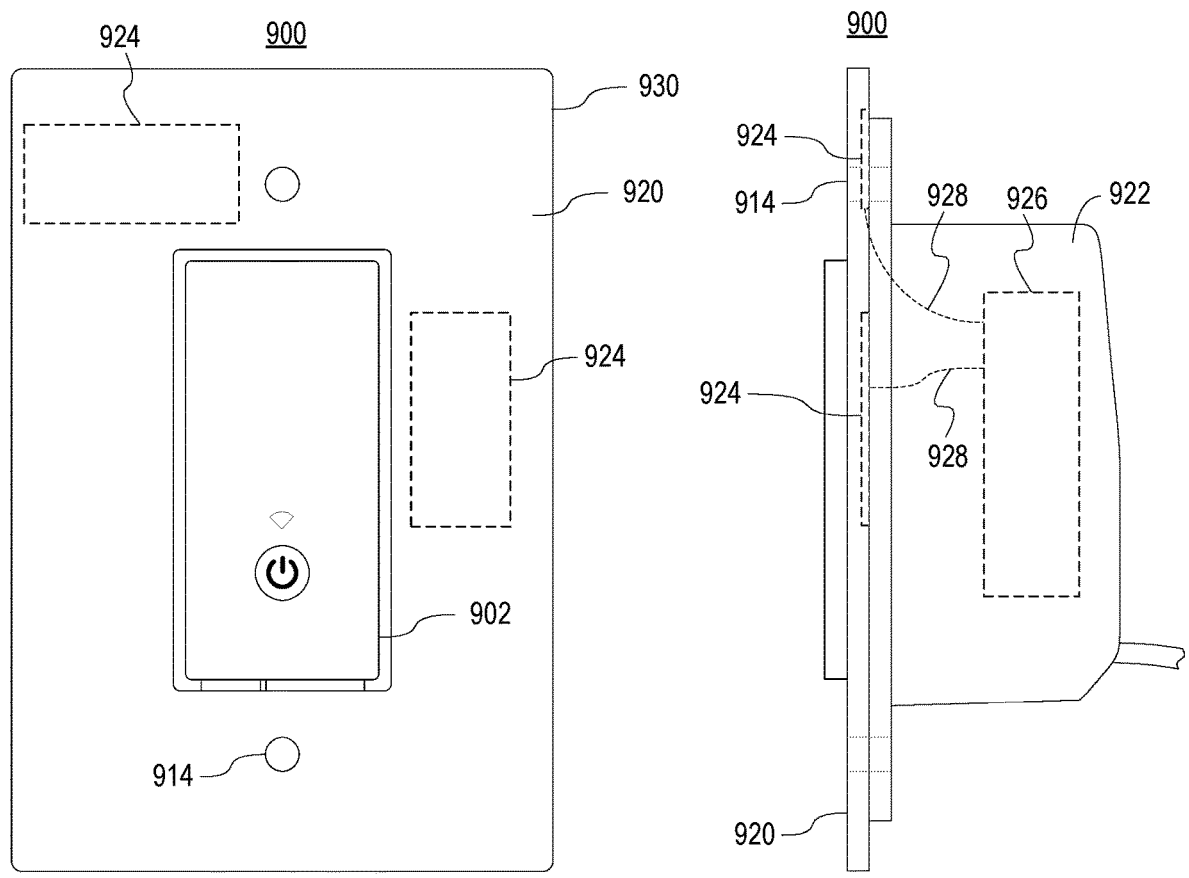
FIG. 9 is an illustration of an example of front and side views of a network device, in accordance with an embodiment.

FIG. 9 illustrates example views of a network device 900, with the left panel showing a front view and the right panel showing a side view. The network device 900 may include any of the network devices 102, 104, or 106 described herein. Network device 900 includes a power switch 902, room-facing wall 920, electrical box-facing wall 922 and circuit board 926. The network device 900 may be similar or identical to network device 800, but the network device 900 includes a cover plate 930. The cover plate 930 includes clips 904 to secure the cover plate 930 to a support plate 906 of the network device 900. Clips 904 allow the cover plate 930 to be secured to the support plate 906 without the need to use a screw or other fastener through cover plate apertures 916, thus creating a clean front. Flexure of the cover plate 930 allows clips 904 to bend far enough to pass over the bottom and/or top of the support plate 906 to remove and attach the cover plate 930 to the support plate 906.

Inclusion of the cover plate 930 provides for the ability to mount a wireless antenna 924 at a location that is more forward facing or proud, such that when network device 900 is mounted in an electrical box in a wall, the wireless antenna 924 is not placed within the wall or within the electrical box, but is located outside the wall or electrical box, minimizing or reducing wireless signal interference and/or signal degradation due to the electrical box, the wall and associated building materials. In addition, placing the wireless antenna 924 at an external location eliminates the requirement to include a wireless antenna directly on the circuit board 926, providing additional space on circuit board 926 for inclusion of other components, such as sensors, power switching. For example, a large area of circuit board 926 could be occupied by the required antennas for transmitting with sufficient gain in the 2.4 GHz or 5 GHz frequency, as about 3-6 cm in length are required for half-wavelength dipole antennas at these frequencies.

In addition, cover plate 930 provides additional spatial area for including additional components, such as wireless antennas, switches, touch screen interfaces and the like. In the embodiment shown in FIG. 9, cover plate 930 includes two wireless antennas 924 mounted on room-facing wall 920 below a surface of cover plate 930, so the wireless antennas 924 are not visible to a user when looking at the network device 900 when installed into an electrical box. Wireless antennas 924, however, may be visible from a back view of the network device 900. Transmission lines 928 connect the wireless antennas 924 to wireless transceiver(s) on the circuit board 926. When network device 900 is mounted in an electrical box placed in a wall, the wireless antennas 924 will be positioned at least partially in front of a plane defined by the room-facing surface of the wall. This configuration provides the network device 900 with the capability of reducing or minimizing interference for wireless transmissions between the wireless antenna 924 to a wireless access point, gateway or other wireless device due to the wall, electrical box or associated building materials.

Additionally, the use of multiple wireless antennas 924 optionally allows the network device 900 to transmit at multiple frequencies (e.g., 2.4 GHz and 5 GHz), to transmit simultaneously with vertical and horizontal polarity and/or to include improved reception and transmission characteristics.

Figure 10:
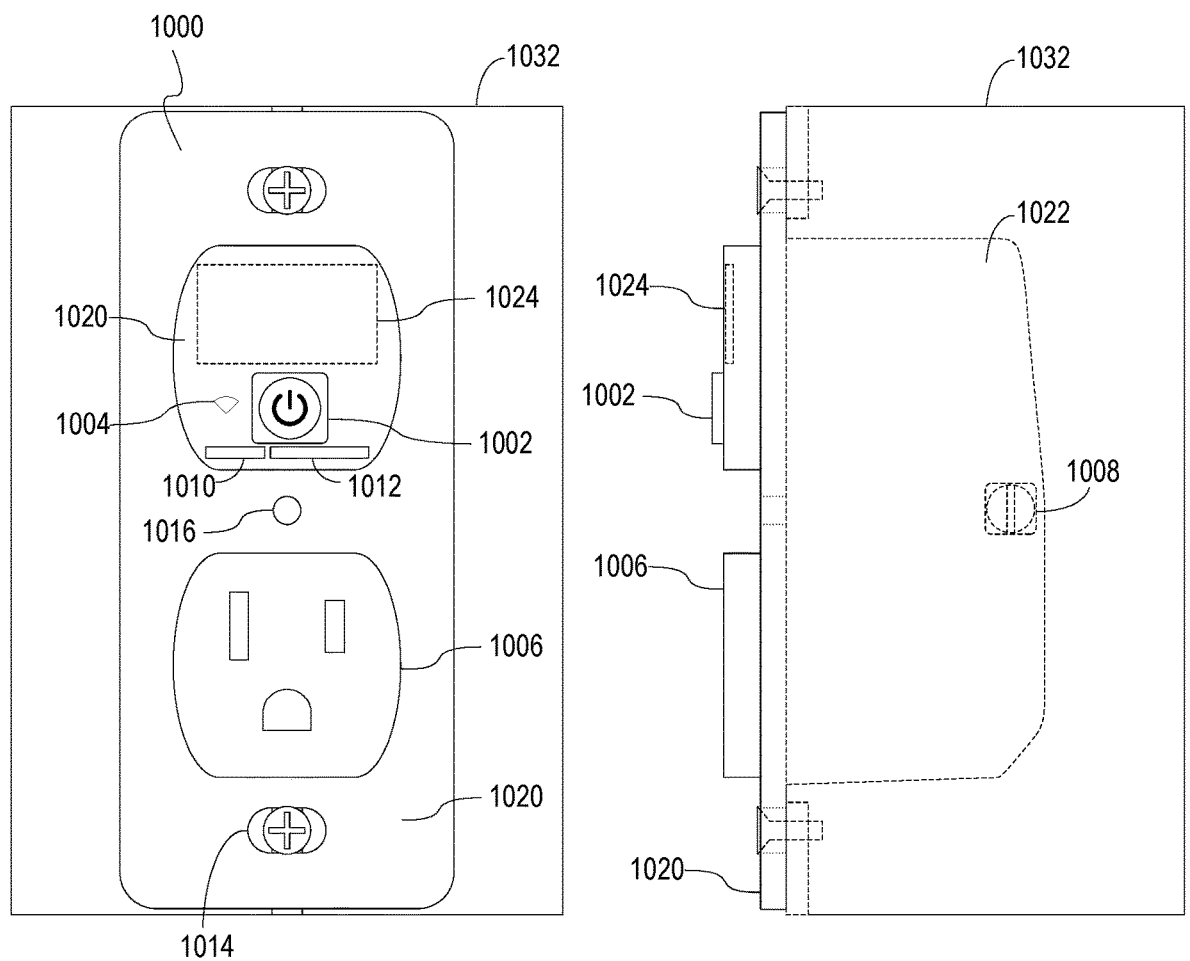
FIG. 10 is an illustration of an example of front and side views of a network device, in accordance with an embodiment.

FIG. 10 illustrates example views of a network device 1000 mounted in an electrical box 1032, with the left panel showing a front view and the right panel showing a side view. Network device 1000 is stylized as an in-wall outlet fixture, such as could be covered by a typical outlet cover plate. The network device 1000 may include any of the network devices 102, 104, or 106 described herein. In some embodiments, the network device 1000 may be a home automation network device. For example, the network device 1000 may include a home automation switch that may be coupled with a home appliance. A user may wirelessly access the network device 1000 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1000 may include a WiFi enabled switch that connects home appliances and other electronic devices to a compatible 802.11b/g/n/ac WiFi network. The network device 1000 may thus allow users to locally or remotely turn devices on or off from anywhere, program customized notifications, and/or change device status. The network device 1000 may further allow a user to create custom schedules or have devices respond to sunrise or sunset.

The network device 1000 includes a power button 1002 that may be depressed in order to change a power state of an electrical device drawing power through network device 1000. In some embodiments, a light source may be integrated with or located behind the power switch. For example, a light-emitting diode (LED) may be located on a circuit board under the power button 1002. The light source may be illuminated when the network device 1000 is providing power to the electrical device, and may not be illuminated when the network device 1000 is not providing power to the electrical device. In the embodiment shown in FIG. 10, power button 1002 is configured with a push-button configuration.

The network device 1000 further includes a communications signal indicator 1004. The signal indicator 1004 may indicate whether the network device 1000 has access to a communications signal, such as a WiFi signal. For example, the signal indicator 1004 may include a light source (e.g., a LED) that illuminates when the network device 1000 is connected to a communications signal. The light source may depict different colors or other characteristics (e.g., flashing, dimming, or the like) to indicate different levels of signal strength or mode of operation.

The network device 1000 includes a restore button 1010. The restore button 1010 may allow a user to reset the network device 1000 to factory default settings. For example, upon being depressed, the restore button 1010 may cause all software on the device to be reset to the settings that the network device 1000 included when purchased from the manufacturer. The network device 1000 also includes a reset button 1012. The reset button 1012 may allow a user to cycle the power of network device 1000. For example, upon being depressed, the reset button 1012 may cause the network device to reboot, simulating disconnection from and reconnection to line power.

The network device 1000 further includes electrical terminals 1008, here depicted as screw terminals coupled to electrical box-facing wall 1022, for connection to line power for providing electrical power to network device 1000 and switchable electrical power to an outlet 1006. Electrical terminals 1008 allows the network device 1000 to be connected to line power providing 120V, 220V, or the like. In turn, an appliance may be connected to network device 1000 by plugging in the appliance to outlet 1006. Once the network device 1000 is registered according to the techniques described above, a power state of outlet 1006 may be controlled by a user using an access device (e.g., access device 108).

The network device 1000 includes a housing configured to be installed in an electrical box 1032, similar to the placement of conventional light switches and electrical outlets. Mounting apertures 1014 are included for attaching the network device 1000 to electrical box 1032, such as where electrical box 1032 is mounted inside a wall. Cover plate aperture 1016 is included for attaching a wall plate over network device 1000, similar to the attachment of a switch/wall plate over a conventional light switch or electrical outlet. The front view of the network device 1000 in the left panel of FIG. 10 shows room-facing wall 1020 of network device 1000. Room-facing wall 1020 of the network device 1000 and electrical box-facing wall 1022 of the network device 1000 are both shown in the right panel of FIG. 10.

The network device 1000 includes a wireless antenna 1024 mounted on a most forward facing or proud location of room-facing wall 1020. In the embodiment shown, the wireless antenna 1024 is positioned beneath a surface of room-facing wall 1020, so the wireless antenna 1024 is not visible to a user when looking at the network device 1000. When network device 1000 is mounted in electrical box 1032 placed in a wall, the wireless antenna 1024 will be positioned at least partially in front of, and optionally fully in front of, a plane defined by the room-facing surface of the wall. This configuration provides the network device 1000 with minimized or reduced interference for wireless transmissions between the wireless antenna 1024 to a wireless access point, gateway or other wireless device due to the wall, electrical box or associated building materials as compared to a configuration where the antenna is located within the wall and/or within electrical box 1032.

Figure 11:
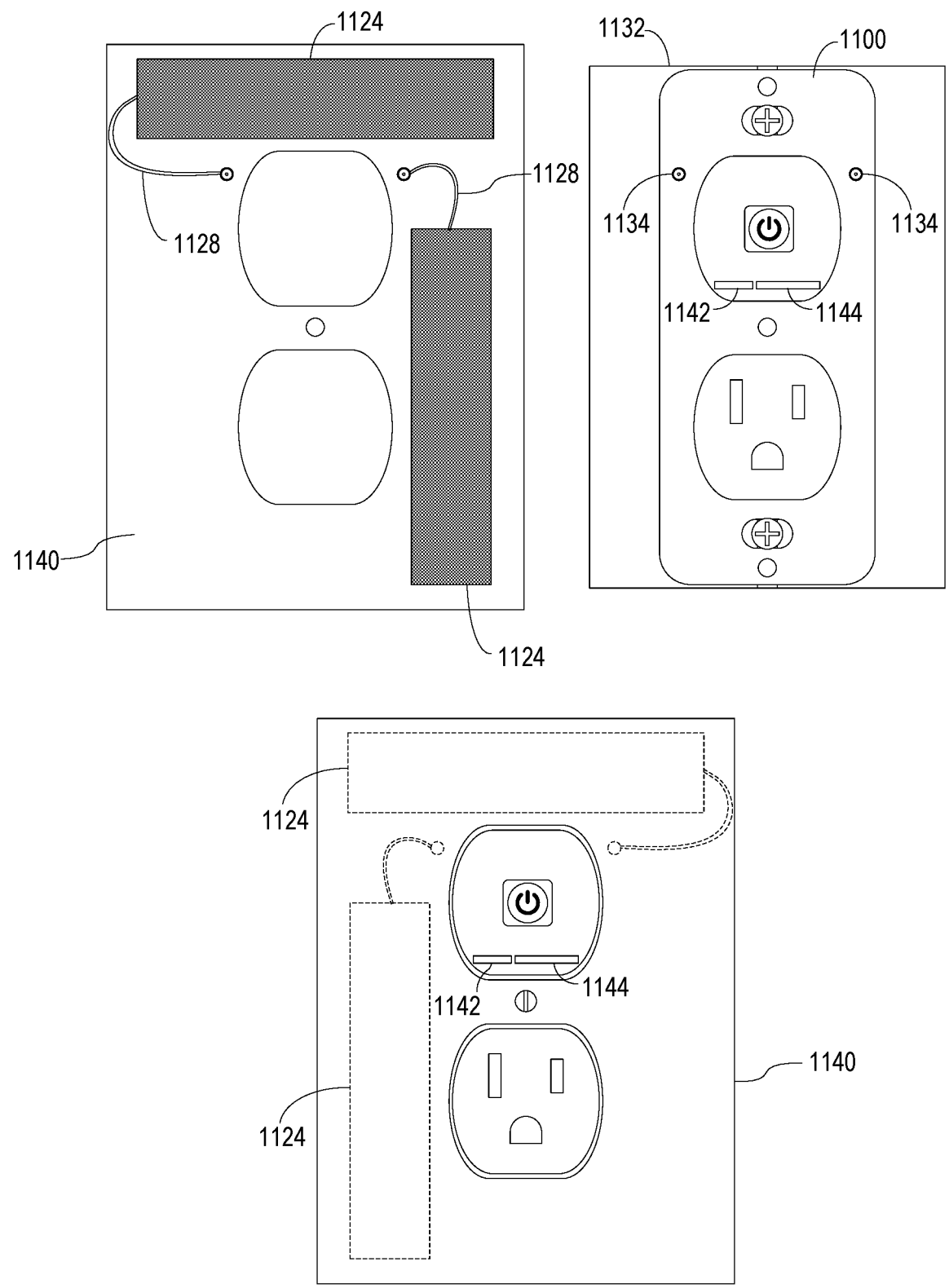
FIG. 11 is an illustration of an example of views of a network device, in accordance with an embodiment.

FIG. 11 illustrates example views of a network device 1100 mounted in an electrical box 1132, with the top left panel showing a rear view of a cover plate 1140, the top right panel showing a front view of network device 1100 and the bottom panel showing a front view of network device 1100 with mounted cover plate 1140. The network device 1100 may include any of the network devices 102, 104, or 106 described herein. The network device 1100 may be similar or identical to network device 1000, but the network device 1100 further includes coaxial connectors 1134 for connecting external wireless antennas 1124 to network device 1100.

The cover plate 1140 includes two wireless antennas 1124 positioned on the back side of the cover plate, with transmission lines 1128 providing for connection of the wireless antenna to the coaxial connectors 1134, which in turn provide a connection to wireless transceiver(s) located within the housing of network device 1100. When cover plate 1140 is attached over network device 1100 mounted in electrical box 1132, wireless antennas 1124 are not visible to a user. In embodiments, the cover plate 1140 is provided as a separate component to network device 1100. In other embodiments, the cover plate 1140 is provided as a removable component to network device 1100. In other embodiments, the cover plate 1140 is provided as an integrated component of network device 1100. The configuration illustrated in FIG. 11 allows wireless antennas 1124 to be mounted at a location more forward facing or proud than a majority of network device 1100. In the embodiment shown, when network device 1100 is mounted in electrical box 1132 placed in a wall and covered by cover plate 1140, the wireless antennas 1124 will be positioned fully in front of a the room-facing surface of the wall. This configuration provides the network device 1100 with reduced or minimized interference for wireless transmissions between the wireless antenna 1024 to a wireless access point, gateway or other wireless device due to the wall, electrical box or associated building materials as compared to a configuration where the antenna is located within the wall and/or within electrical box 1132.

Figure 12:
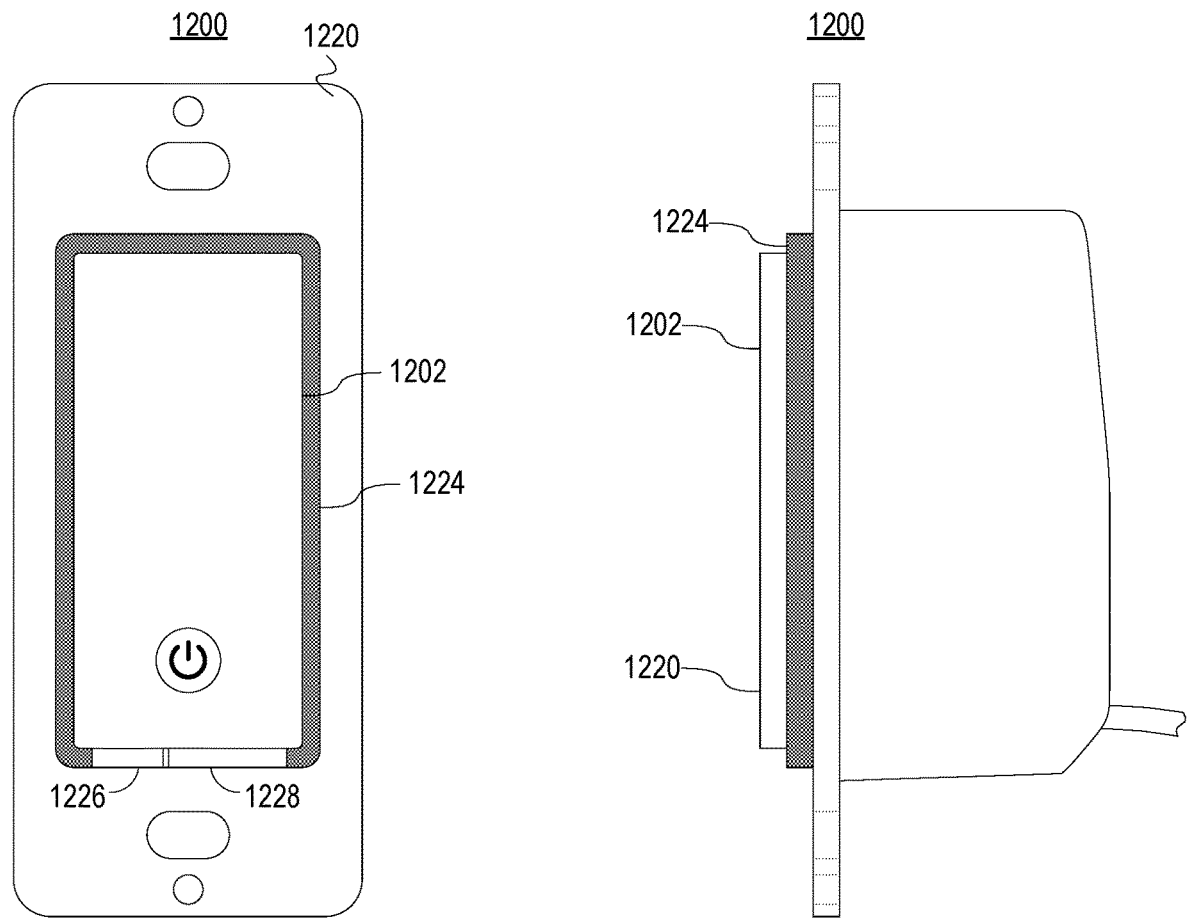
FIG. 12 is an illustration of an example of front and side views of a network device, in accordance with an embodiment.
Figure 13:
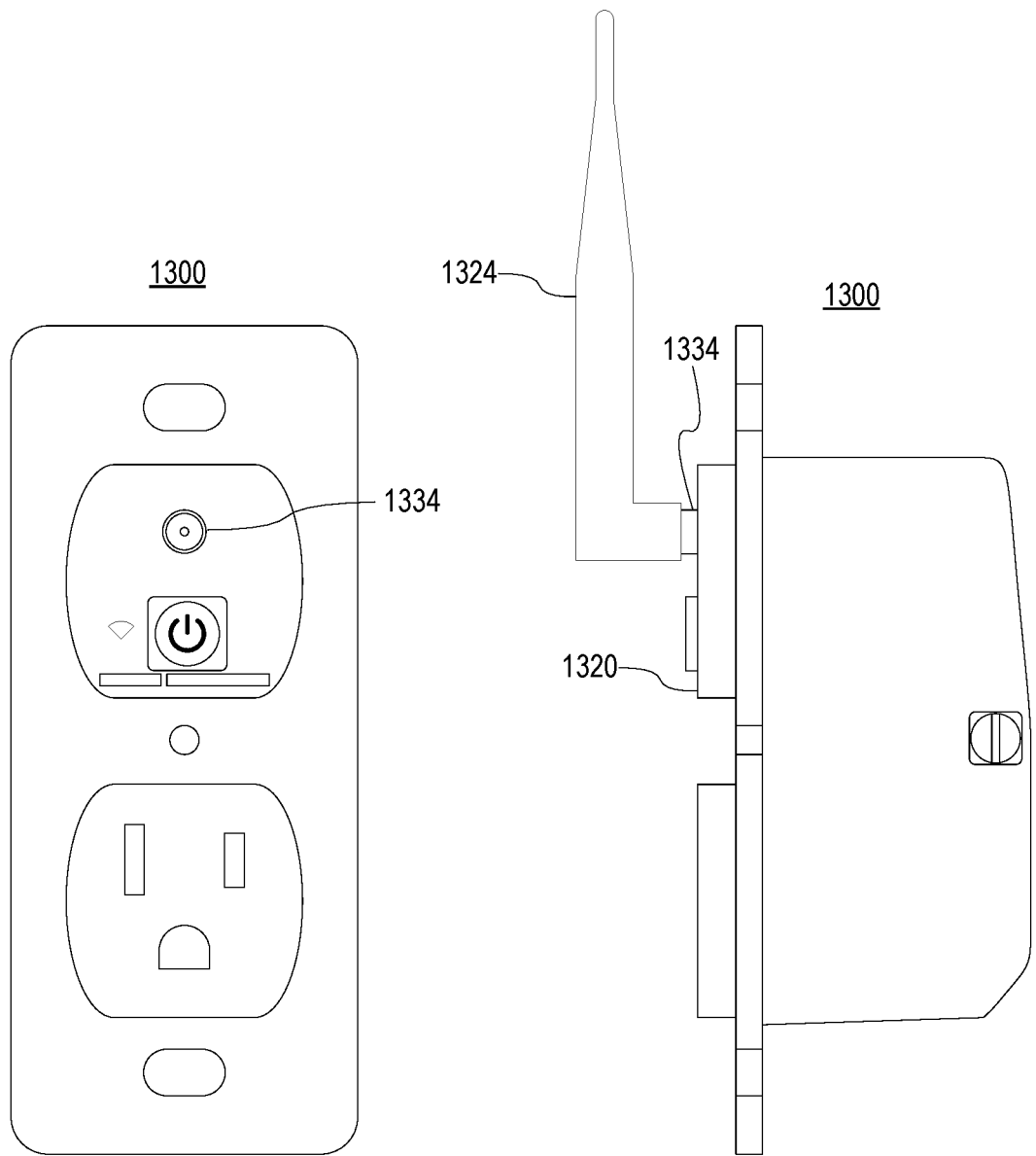
FIG. 13 is an illustration of an example of front and side views of a network device, in accordance with an embodiment.
Figure 14:
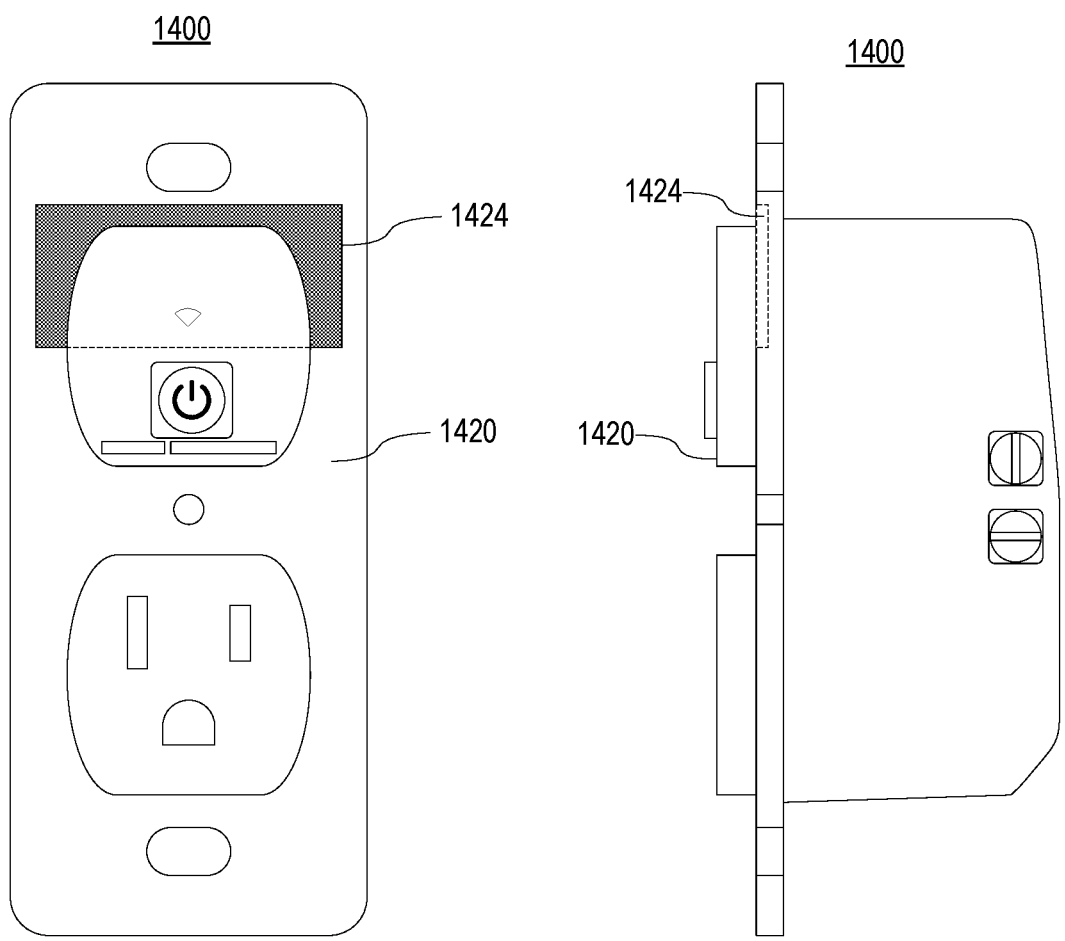
FIG. 14 is an illustration of an example of front and side views of a network device, in accordance with an embodiment.

In various embodiments, the wireless antenna(s) of a network device can be located with any configuration and at any location on or in the network device. In a specific embodiment, the wireless antenna, or optionally a portion thereof, is positioned in front of a wall when the network device is mounted in an electrical box located in a wall. For example, FIG. 12 shows a network device 1200 embodiment where the wireless antenna 1224 is mounted on the room-facing wall 1220 of the network device 1200, surrounding power switch 1202. Here, the wireless antenna 1224 is not covered by another component. In another embodiment, shown in FIG. 13, network device 1300 includes a coaxial connector 1334 on the room-facing wall 1320, allowing a high-gain external wireless antenna 1324 to be attached. Although wireless antenna 1324 is depicted as an omni-directional antenna, in other embodiments, an external directional wireless antenna is utilized. In another embodiment, shown in FIG. 14, network device 1400 includes a wireless antenna 1424 that is partially covered beneath room-facing wall 1420 and partially exposed. As such, wireless antenna 1424 is visible to a user looking at room-facing wall 1420 when network device 1400 is mounted in an electrical box, although the visible portion of wireless antenna 1424 would be at least partially obscured by a cover plate mounted over the outlet fixture. In addition, in the embodiment shown in FIG. 14, wireless antenna 1424 is embedded in the structure of room-facing wall 1420. Other embodiments are contemplated where the wireless antenna is partially embedded in the housing wall of the network device. For embodiments where a wireless antenna is exposed, a non-conducting coating is optionally provided on a surface of the exposed wireless antenna.

Figure 15:
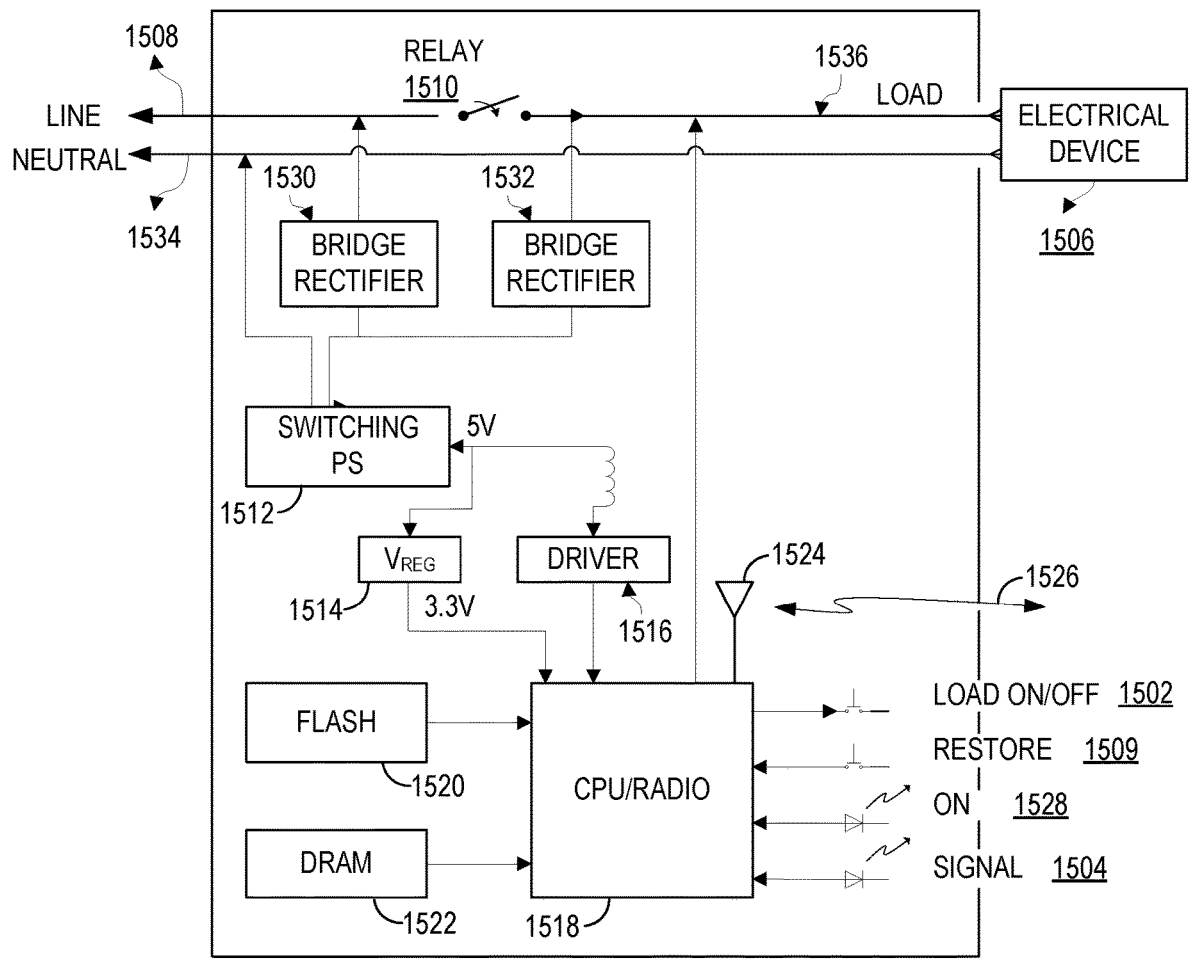
FIG. 15 is an example of a block diagram of a network device, in accordance with an embodiment.

FIG. 15 is an example of a block diagram of a network device 1500 depicting different hardware and/or software components of the network device 1500. As described above with respect to FIGS. 6-14, the network device 1500 includes the electrical device 1506, which may be an outlet, the connection to an electrical supply 1540, the power button 1502, the restore button 1509, and the communications signal indicator 1504. The network device 1500 also includes light source 1528 associated with the power button 1502. As previously described, the light source 1528 may be illuminated when the network device 1500 is powered on.

The network device 1500 further includes a relay 1510. The relay 1510 is a switch that controls whether power is relayed from the electrical supply 1540 to the electrical device 1506. The relay 1510 may be controlled either manually using the power button 1502 or remotely using wireless communication signals. For example, when the power button 1502 is in an ON position, the relay 1510 may be closed so that power is relayed from the electrical supply 1540 to the electrical device 1506. When the power button 1502 is in an OFF position, the relay 1510 may be opened so that current is unable to flow from the electrical supply 1540 to the electrical device 1506. As another example, an application or program running on an access device may transmit a signal that causes the relay 1510 to be opened or closed. For instance, an access application may display a graphical interface on the access device that includes a power button. The user may tap or otherwise select the power button, and the access application may send a communication signal (e.g., over a WiFi network) to the network device 1500 instructing the network device 1500 to open or close the relay 1510.

The network device 1500 further includes flash memory 1520 and dynamic random access memory (DRAM) 1522. The flash memory 1520 may be used to store instructions or code relating to an operating system, one or more applications, and any firmware. The flash memory 1520 may include nonvolatile memory so that any firmware or other program can be can updated. In the event the network device 1500 loses power, information stored in the flash memory 1520 may be retained. The DRAM 1522 may store various other types of information needed to run the network device 1500, such as all runtime instructions or code.

The network device 1500 further includes a CPU/Radio 1518. The CPU/Radio 1518 controls the operations of the network device 1500. For example, the CPU/Radio 1518 may execute various applications or programs stored in the flash memory 1520 and/or the dynamic random access memory (DRAM) 1522. The CPU/Radio 1518 may also receive input from the various hardware and software components, interpret the input, and perform one or more functions in response to the input. As one example, the CPU/Radio 1518 may determine whether the power button 1502 has been pressed, and determines whether the relay 1510 needs to be opened or closed. The CPU/Radio 1518 may further perform all communications functions in order to allow the network device 1500 to communicate with other network devices, one or more gateways, a cloud network, and/or one or more access devices. While the CPU and radio of the network device 1500 are shown to be combined in the CPU/Radio 1518, one of ordinary skill in the art will appreciate that, in some embodiments, the CPU and radio (also referred to herein as a wireless transceiver) may be separately located within the network device 1500. For example, CPU circuitry may be situated at a separate location on a circuit board from the location of radio circuitry, the CPU circuitry may be located on a different circuit board from the radio circuitry, or the like.

The network device 1500 may communicate with other devices and/or networks via wireless signal 1526 using antenna 1524. For example, antenna 1524 may include a 2.4 GHz antenna, a 5 GHz antenna, or the like, that can transmit and receive WiFi communications signals. The antenna 1524 may include other types of antennas that can communicate Bluetooth® signals, Zigbee® signals, Ultra-Wideband (UWB) signals, and/or the like. In some embodiments, the network device 1500 may include multiple antennas for communicating different types of communication signals. As one example, the network device 1500 may include both a 2.4 GHz antenna and a 5 GHz antenna.

The network device 1500 further includes a driver 1516, a switching power supply 1512, and a voltage regulator 1514. The driver 1516 may include instructions or code that can be used to translate control signals or commands received from applications running on the DRAM 1522 to commands that the various hardware components in the network device 1500 can understand. In some embodiments, the driver 1516 may include an ambient application running on the DRAM 1522. The switching power supply 1512 may be used to transfer power from the electrical supply 1540 to the various loads of the network device 1500 (e.g., CPU/Radio 1518). The switching power supply 1512 may efficiently convert the voltage and current characteristics of the electrical power to a level that is appropriate for the components of the network device 1500. For example, the switching power supply 1512 may perform AC-DC conversion. In some embodiments, the switching power supply 1512 may be used to control the power that is relayed from the electrical supply 1540 to the electrical device 1506. The voltage regulator 1514 may be used to convert the voltage output from the switching power supply 1512 to a lower voltage usable by the CPU/Radio 1518. For example, the voltage regulator 1514 may regulate the DC voltage from 5V to 3.3V.

The network device 1500 can include a neutral connection 1534, a line connection 1508, and a load connection 1536 that connect the network device 1500 to the electrical supply 1540 and the electrical device 1506. The electrical supply 1540 can include a line supply 1542 and a neutral supply 1544. Both the neutral connection 1534 and the neutral wire of the electrical device 1506 can be connected to the neutral supply 1544. The line connection 1508 and load connection 1536 are connected, in series, between the line supply 1542 and the electrical device 1506, to switch the electrical device 1506.

The switching power supply 1512 can draw power through the neutral connection 1534 and either the line connection 1508 or load connection 1536, allowing the network device 1500 to operate even if the line connection 1508 and load connection 1536 are installed improperly (e.g., if the load connection 1536 is connected to the line supply 1542 and the line connection 1508 is connected to the electrical device 1506). The switching power supply 1512 is connected to a first bridge rectifier 1530 that is connected to the line connection 1508 and a second bridge rectifier 1532 that is connected to the load connection 1536. The dual bridge rectifiers 1530, 1532 prevent undesired current from flowing between the line connection 1508 and load connection 1536. The dual bridge rectifiers 1530, 1532 allow the switching power supply 1512 to receive power from the line supply 1542 regardless as to whether the line connection 1508 or the load connection 1536 is connected to the line supply 1542. The dual bridge rectifiers 1530, 1532 can increase the ease of installation significantly and reduce the number of instances where a user believes a device is malfunctioning when the actual problem is incorrect installation, whether due to user error or incorrect wire labeling from the electrical supply 1540.

In various embodiments, functions may be stored as one or more computer-program products, such as instructions or code, in a non-transitory machine-readable storage medium, such as the flash memory 1520 and/or the DRAM 1522. The network device 1500 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1520 and/or the DRAM 1522, may be a processor-readable memory and/or a computer-readable memory that stores software code (programming code, instructions, etc.) configured to cause a processor(s) within the CPU/Radio 1518 to perform the functions described. In other embodiments, one or more of the functions described may be performed in hardware.

A set of these instructions and/or code might be stored on a non-transitory machine-readable storage medium, such as the flash memory 1520 and/or the DRAM 1522. In some cases, the storage medium might be incorporated within a computer system, such as the CPU/Radio 1518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1500 and/or might take the form of source and/or installable code, which, upon compilation and/or installation on the network device 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1500 may have other components than those depicted in FIGS. 6-14. Further, the embodiments shown in the figures are only one example of network devices that may incorporate embodiments of the invention. In some other embodiments, network device 1500 may have more or fewer components than shown in the figure, may combine two or more components, or may have a different configuration or arrangement of components.

Figure 16:
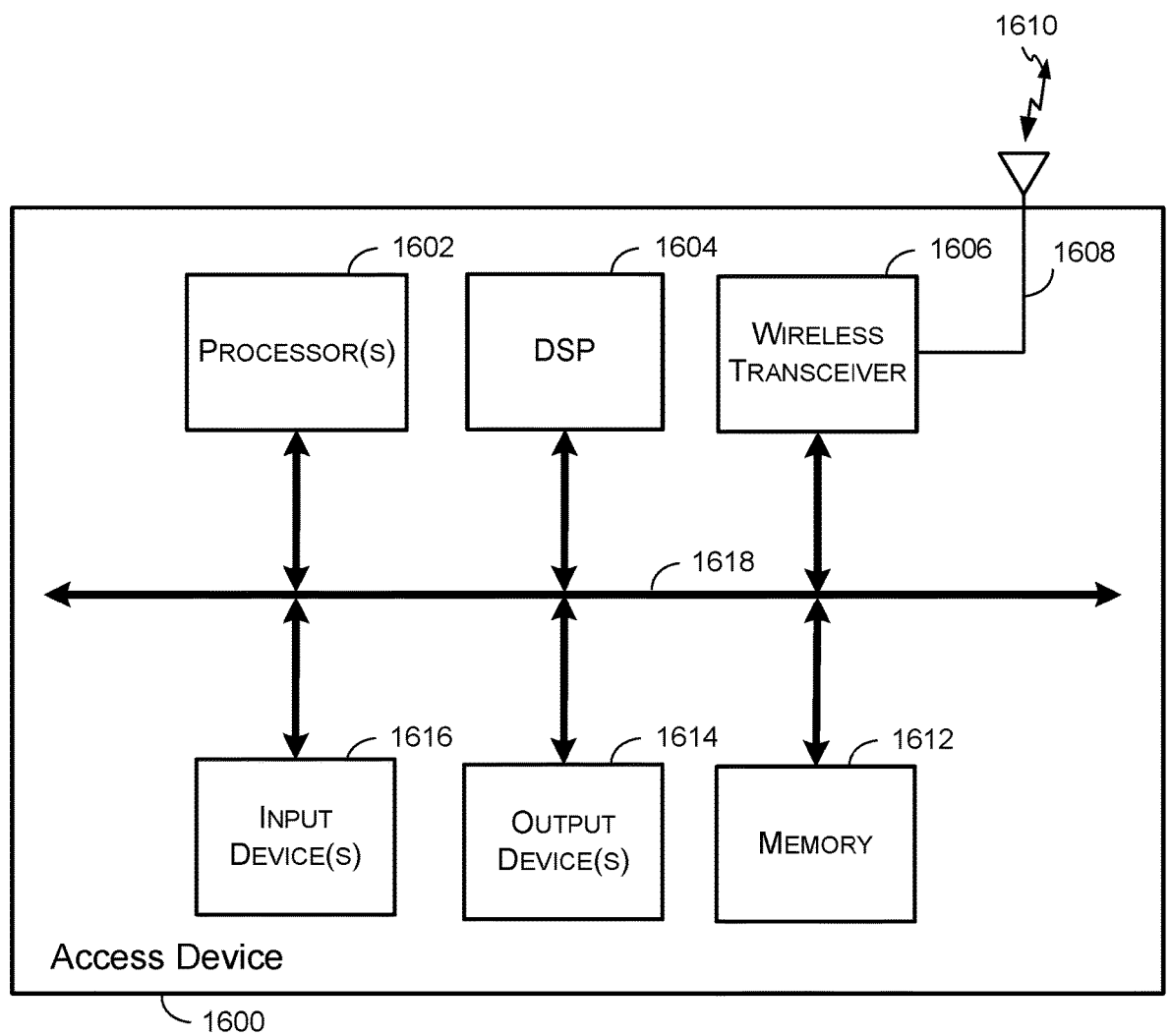
FIG. 16 is a block diagram illustrating an example of an access device, in accordance with some embodiments.

FIG. 16 illustrates an example of an access device 1600. The access device 1600 may include any human-to-machine interface with network connection capability that allows access to a network. For example, the access device 1600 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation a camera, a mouse, a keyboard, a touch sensitive screen, a touch pad, a keypad, and/or the like; and one or more output devices 1614, which can include, without limitation, a display, a printer, and/or the like.

The access device 1600 may include one or more wireless transceivers 1606 connected to the bus 1618. The wireless transceiver 1606 may be operable to receive wireless signals (e.g., signal 1610) via antenna 1608. The wireless signal 1610 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1606 may be configured to receive various radio frequency (RF) signals (e.g., signal 1610) via antenna 1608 from one or more gateways, network devices, other access devices, cloud networks, and/or the like. Access device 1600 may also be configured to decode and/or decrypt, via the DSP 1604 and/or processor(s) 1602, various signals received from one or more gateways, network devices, other access devices, cloud networks, and/or the like.

The access device 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1612, such as RAM, ROM, FLASH, or disc drive, and executed by processor(s) 1602 or DSP 1604. The access device 1600 can also comprise software elements (e.g., located within the memory 1612), including, for example, an operating system, device drivers, executable libraries, and/or other code, such as one or more application programs, which may comprise computer programs implementing various functions. Memory 1612 may be a non-transitory machine-readable storage medium, processor-readable memory, and/or a computer-readable memory that stores the one or more computer-program products configured to cause the processor(s) 1602 and/or DSP 1604 to perform the various functions. In other embodiments, the various functions described may be performed in hardware.

Figure 17:
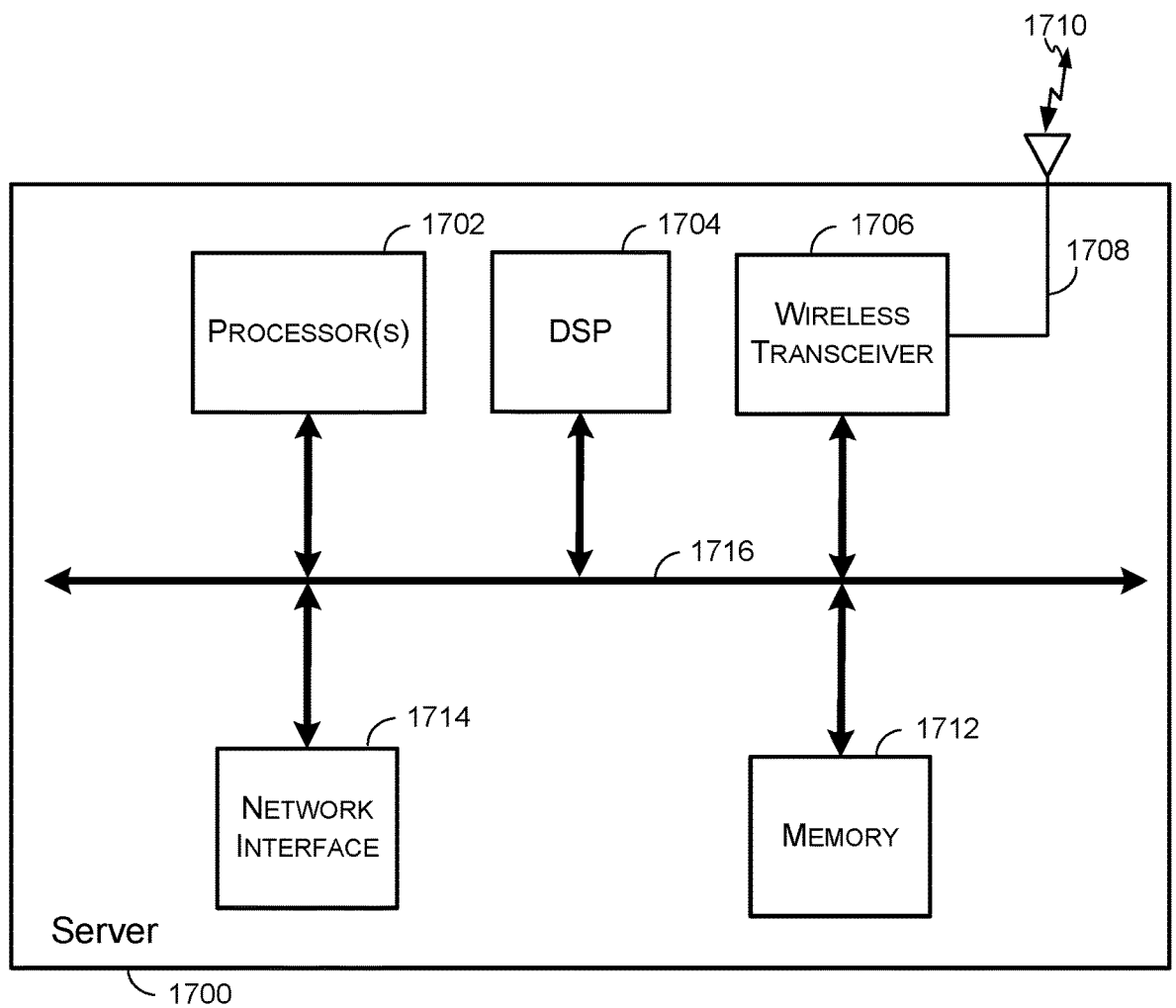
FIG. 17 is a block diagram illustrating an example of a server, in accordance with some embodiments.

FIG. 17 illustrates an example of a server 1700. The server 1700 includes hardware elements that can be electrically coupled via a bus 1716 (or may otherwise be in communication, as appropriate). In one embodiment, the bus 1716 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like), memory 1712, DSP 1704, a wireless transceiver 1706, a bus 1716, and antenna 1708, used for transmitting/receiving wireless signal 1710. Furthermore, in addition to the wireless transceiver 1706, server 1700 can further include a network interface 1714 to communicate with a network (e.g., a local area network, a network of a preferred carrier, Internet, etc.).

The server 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1712. The server 1700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1712 may be a non-transitory machine-readable storage medium, processor-readable memory, and/or a computer-readable memory that stores the one or more computer-program products configured to cause the processor(s) 1702 to perform the functions described. In other embodiments, one or more of the functions described may be performed in hardware.

A set of these instructions and/or code might be stored on a non-transitory machine-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1700 and/or might take the form of source and/or installable code, which, upon compilation and/or installation on the server 1700 (e.g., using any of a variety of generally available compilers, installation programs, compression/decompression utilities, etc.) then takes the form of executable code.

Figure 18:
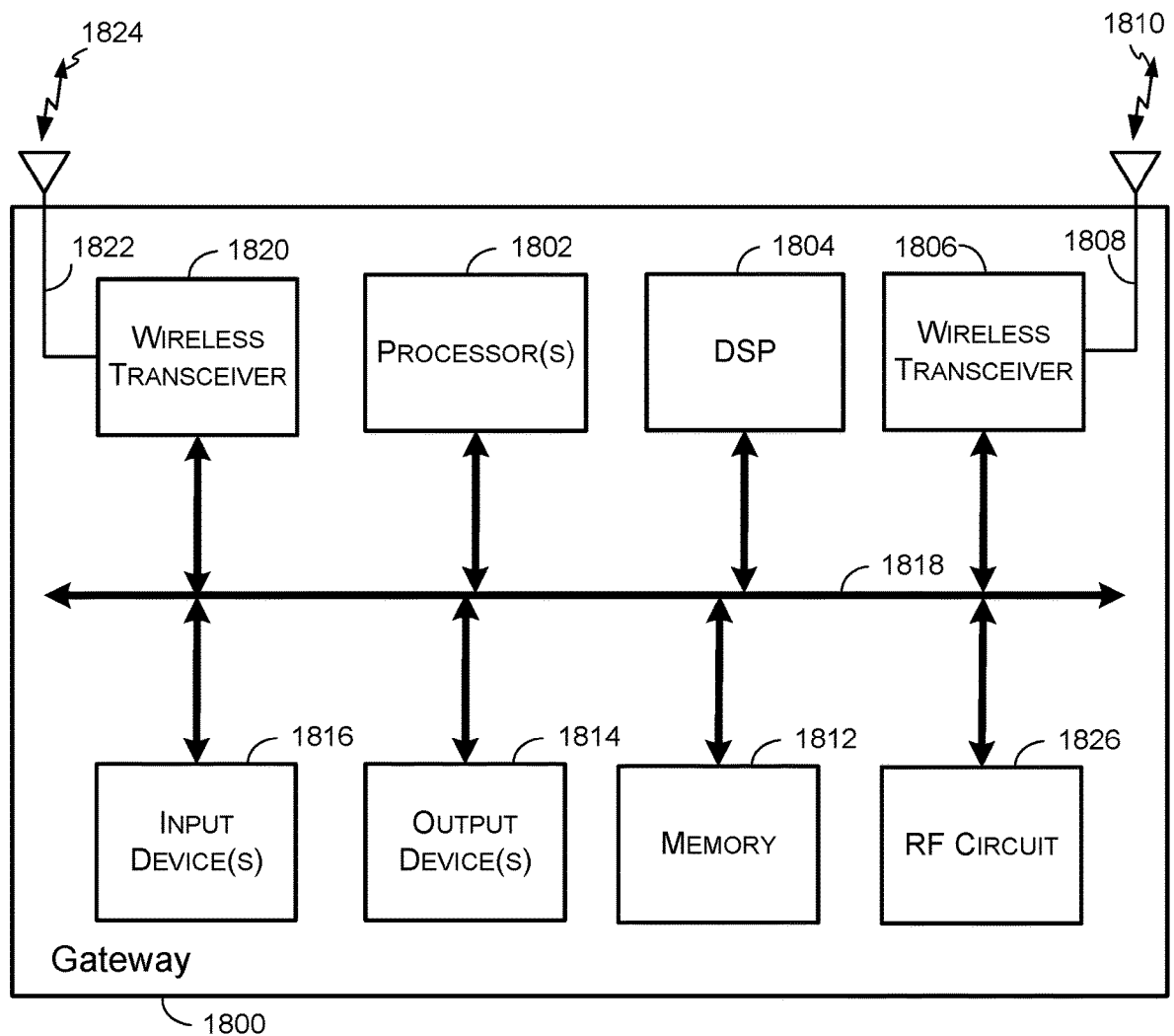
FIG. 18 is a block diagram illustrating an example of a gateway, in accordance with some embodiments.

FIG. 18 illustrates an example of a gateway 1800. The gateway 1800 may include a range extending device, a router, an access point, a modem, and/or any other device that provides network access among one or more computing devices and/or external networks. For example, the gateway 1800 may include a router gateway with access point and router functionality, and may further include an Ethernet switch and/or a modem. As another example, the gateway 1800 may include a range extending gateway that may be used to improve signal range and strength within a network by taking an existing signal from another gateway (e.g., a router gateway, an access point, or the like) and rebroadcasting the signal to create a second logical network.

The gateway 1800 includes hardware elements that can be electrically coupled via a bus 1818 (or may otherwise be in communication, as appropriate). In one embodiment, the bus 1818 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like); one or more input devices 1816, which can include without limitation one or more buttons, a keyboard, a keypad, a touch sensitive screen, a touch pad, and/or the like; and one or more output devices 1814, which can include, without limitation, a display, light or sound indicators, and/or the like.

The gateway 1800 may include one or more wireless transceivers 1806 and 1820 connected to the bus 1818. The wireless transceiver 1806 may be operable to receive wireless signals (e.g., a wireless signal 1810) via an antenna 1808. The wireless transceivers 1820 may be operable to receive wireless signals (e.g., a wireless signal 1814) via an antenna 1822. The wireless transceivers 1806 and 1820 may each include a WiFi transceiver radio designed to transmit and receive signals using frequencies of a specific frequency band, which may be referred to herein as "WiFi circuits." For example, wireless transceiver 1806 may include a 2.4 GHz WiFi circuit, and wireless transceiver 1820 may include a 5 GHz WiFi circuit. Accordingly, the gateway 1800 may include a single WiFi circuit for a first WiFi frequency band, and a single WiFi circuit for a second WiFi frequency band. In some embodiments, the gateway 1800 may include multiple wireless transceivers (not shown) for each available frequency band. The antennas 1808 and 1822 may include multiple band antennas that can transmit and/or receive signals over different frequency bands.

The gateway 1800 may further include radio frequency (RF) circuit 1826. In some embodiments, the wireless transceivers 1806 and 1820 may be integrated with or coupled to the RF circuit 1826 so that the RF circuit 1826 includes the wireless transceivers 1806 and 1820. In some embodiments, the wireless transceivers 1806 and 1820 and the RF circuit 1826 are separate components. The RF circuit 1826 may include a RF amplifier that may amplify signals received over antennas 1808 and 1822. The RF circuit 1826 may also include a power controller that may be used to adjust signal amplification by the RF amplifier. The power controller may be implemented using hardware, firmware, software, or any combination thereof.

The wireless signals 1810 and 1824 may be transmitted via a wireless network. In some embodiments, the wireless network may be any wireless network such as a wireless local area network (e.g., local area network 100), such as a Personal Access Network (PAN), such as Bluetooth® or Zigbee®, or a cellular network (e.g. a GSM, WCDMA, LTE, CDMA2000 network). Wireless transceivers 1806 and 1820 may be configured to receive various radio frequency (RF) signals (e.g., signals 1810 and 1824) via antennas 1808 and 1822, respectively, from one or more other gateways, access devices, network devices, cloud networks, and/or the like. Gateway 1800 may also be configured to decode and/or decrypt, via the DSP 1804 and/or processor(s) 1802, various signals received from one or more gateways, network devices, cloud networks, and/or the like.

The gateway 1800 may include a power supply (not shown) that can power the various components of the gateway 1800. The power supply may include a switch-mode power supply, a linear power supply, a push-pull power supply, or any other suitable type of power supply. In some embodiments, the gateway 1800 may include multiple power supplies. For example, a switch-mode power supply may be used to condition input power, and a linear power supply may be used to power the RF circuit 1826. The power supply may be configured to operate over various ranges of appropriate input voltages.

The gateway 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1812, such as RAM, ROM, FLASH, or disc drive, and executed by processor(s) 1802 or DSP 1804. The gateway 1800 can also comprise software elements (e.g., located within the memory 1812), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1812 may be a non-transitory machine-readable storage medium, processor-readable memory, and/or a computer-readable memory that stores the one or more computer-program products configured to cause the processor(s) 1802 to perform the functions described. In other embodiments, one or more of the functions described may be performed in hardware.

A set of these instructions and/or code might be stored on a non-transitory machine-readable storage medium, such as the memory 1812. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1800 and/or might take the form of source and/or installable code, which, upon compilation and/or installation on the gateway 1800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A network device, comprising:
    a housing mountable inside an electrical box and including a room-facing wall and an electrical box-facing wall;
    a data processor within the housing connected to a wireless transceiver and a memory for storing a customizable setting;
    a relay configured to control a power state of an electrical device, wherein the data processor is operable to open or close the relay;

electrical terminals connectable to an electrical supply for providing power to the data processor and for providing switchable power to the electrical device through the relay, wherein the electrical terminals are coupled to the electrical box-facing wall of the housing; and a restore button located on the room-facing wall and connected to the data processor for erasing the customizable setting of the network device.

2. The network device of claim 1, wherein the housing further includes a bezel surrounding a main switching element, and wherein the restore button is located inline with the bezel.

3. The network device of claim 2, wherein the restore button has a button contour that follows a bezel contour of the bezel.

4. The network device of claim 3, wherein the main switching element extends away from the electrical box further than the bezel.

5. The network device of claim 1, further comprising a cover plate for covering a portion of the room-facing wall, wherein the restore button is not covered by the cover plate.

6. The network device of claim 1, further comprising a main switching element connected to the data processor for controlling the relay.

7. The network device of claim 6, further comprising a restart button for restarting the data processor.

8. The network device of claim 7, wherein the housing further includes a bezel surrounding the main switching element, and wherein the restore button and the restart button are both located inline with the bezel.

9. The network device of claim 8, wherein the restore button and the restart button each have button contours that follows a bezel contour of the bezel.

10. The network device of claim 8, further comprising a cover plate for covering a portion of the room-facing wall, wherein the bezel, the restore button, and the restart button are not covered by the cover plate.

11. A network device, comprising:
a housing mountable in a structure, the housing having a user-facing surface;
a circuit board having a data processor, a wireless transceiver, and a memory for storing a customizable setting, wherein the circuit board is positioned within the housing; and
a restore button located on the user-facing surface of the housing and connected to the data processor for erasing the customizable setting of the network device;
wherein the housing further includes a bezel surrounding a main switching element, and wherein the restore button is located inline with the bezel.

12. The network device of claim 11, wherein the restore button has a button contour that follows a bezel contour of the bezel.

13. The network device of claim 12, wherein the main switching element extends away from the structure further than the bezel.

14. The network device of claim 11, further comprising a cover plate for covering a portion of the user-facing surface, wherein the restore button is not covered by the cover plate.

15. The network device of claim 11, further comprising a restart button for restarting the data processor.

16. A network device, comprising:
a housing mountable in a structure, the housing having a user-facing surface;
a circuit board having a data processor, a wireless transceiver, and a memory for storing a customizable setting, wherein the circuit board is positioned within the housing;
a restore button located on the user-facing surface of the housing and connected to the data processor for erasing the customizable setting of the network device;
a relay configured to control a power state of an electrical device, wherein the data processor is configured to open or close the relay;
electrical terminals configured to connect to an electrical supply, to provide power to the circuit board and to provide switchable power to the electrical device through the relay, wherein the electrical terminals are coupled to an electrical box-facing wall of the housing; and
a main switching element connected to the data processor for controlling the relay.

17. The network device of claim 16, further comprising a restart button for restarting the data processor.

18. The network device of claim 17, wherein the restore button and the restart button each have button contours that follows a bezel contour of the bezel.

19. The network device of claim 18, further comprising a cover plate for covering a portion of a room-facing wall, wherein the bezel, the restore button, and the restart button are not covered by the cover plate.

20. The network device of claim 19, wherein the main switching element extends away from the structure further than the bezel.

* * * * *